(12) United States Patent
Brown, III

(10) Patent No.: US 7,197,508 B1
(45) Date of Patent: Mar. 27, 2007

(54) SYSTEM AND METHOD FOR OBTAINING, EVALUATING, AND REPORTING MARKET INFORMATION

(76) Inventor: Frederick R. Brown, III, 256 Blanchard Rd., Cumberland, ME (US) 04021

(*) Notice: Subject to any disclaimer, the term of this patent is extended or adjusted under 35 U.S.C. 154(b) by 386 days.

(21) Appl. No.: 10/626,959

(22) Filed: Jul. 25, 2003

(51) Int. Cl.
*G06F 17/30* (2006.01)

(52) U.S. Cl. ................................. 707/102; 707/104.1
(58) Field of Classification Search ................ 707/9, 707/102, 201, 100, 101, 103 R, 104.1
See application file for complete search history.

(56) References Cited

U.S. PATENT DOCUMENTS

| | | | | |
|---|---|---|---|---|
| 4,853,843 | A * | 8/1989 | Ecklund | 707/203 |
| 5,331,544 | A | 7/1994 | Lu et al. | |
| 5,970,464 | A | 10/1999 | Apte et al. | |
| 5,970,467 | A | 10/1999 | Alavi | |
| 6,092,069 | A | 7/2000 | Johnson et al. | |
| 6,195,751 | B1 * | 2/2001 | Caronni et al. | 713/163 |
| 6,240,188 | B1 * | 5/2001 | Dondeti et al. | 380/284 |
| 6,324,533 | B1 | 11/2001 | Agrawal et al. | |
| 6,584,566 | B1 * | 6/2003 | Hardjono | 713/163 |
| 6,606,706 | B1 * | 8/2003 | Li | 713/162 |
| 6,850,987 | B1 * | 2/2005 | McCanne et al. | 709/238 |
| 6,915,434 | B1 * | 7/2005 | Kuroda et al. | 713/193 |
| 2002/0010663 | A1 * | 1/2002 | Muller | 705/30 |
| 2002/0123952 | A1 * | 9/2002 | Lipper, III | 705/36 |
| 2002/0161891 | A1 * | 10/2002 | Higuchi et al. | 709/226 |
| 2003/0135827 | A1 * | 7/2003 | Kanzler et al. | 715/522 |
| 2004/0041836 | A1 * | 3/2004 | Zaner et al. | 345/751 |

OTHER PUBLICATIONS

Screens for "Information Resources," (2003), website www.infores.com (7 pages) (specific link no longer active).
National Business Group on Health's Council on Employee Health and Productivity website empaq.org w training partnership, 3 pp, original publication date unknown.
Disability Management Employer Coalition and Washington Business Group press release from website www.empaq.org, 2 pp, Apr. 30, 2003.
EMPAQ Benchmarking Program & IBI's Full-Cost Benchmarking Study FAQ's from website empaq.org, 7 pp, original publication date unknown.
Benchmarking Benefits Performance Program Workers' Compensation, Short-Term Disability, etc. from website www.empaq.org Indicating CY 2003 experience, 6 pp, Apr. 2005.

(Continued)

*Primary Examiner*—Frantz Coby
(74) *Attorney, Agent, or Firm*—Verrill Dana, LLP; Chris A. Caseiro

(57) ABSTRACT

A computer-enabled method and related system for allowing market survey contributors to provide their relevant market information and to access that information and the information of others in the same market. Each contributor is permitted to view its own specific private information and to view summary information of the entire market and aspects of the entire market but without being able to identify the other contributors. The system includes an information database, a query library and a computer program to query the database and evaluate and report on the database information in response to a query. Rules are set to deny access to information not provided by a contributor and to deny access to information with an insufficient number of contributors and/or number of points of data.

30 Claims, 32 Drawing Sheets

OTHER PUBLICATIONS

EMPAQ Benchmarking Program & IBI's Full-Cost Benchmarking Study Benchmarking Opportunities from website www.empaq.org, 11 pp, original publication date unknown.

Integrated Benefits Institute Health & Productivity Intelligence Suite offering on website www.benefitsintelligence.org, 4 pp, original publication date unknown.

IBI's Absence, Lost Productivity & Health Study from website benefitsintelligence.org, 10 pp, copyright 2004.

Screens for "LIMRA Online", (no date), website www.limra.com (9 pages).

Screens "Bank Insurance Market Research Group", (no date) singerpubs.com (4 pages).

Screens "ISO ClaimSearch", (no date), website iso.com (7 pages).

Screens "SilverPlume", (no date), website silverplume.com (4 pages).

Screen "Insurance Market Research Reports", (no date), website uce.ac.uk/librar (1 page).

Screen "Mintel", (no date), website mintel.com (1 page).

Screen "Mindbranch Research & Analysis", (mo date), website mindbranch.com (1 page).

Screens "G McGee & Associates", (no date), website gmcgee.com (3 pages).

Screens "ACNielsen", (no date), website acnielsen.com (4 pages).

Screens "Synovate Research reinvented", (no date), website synovate.com (4 pages).

* cited by examiner

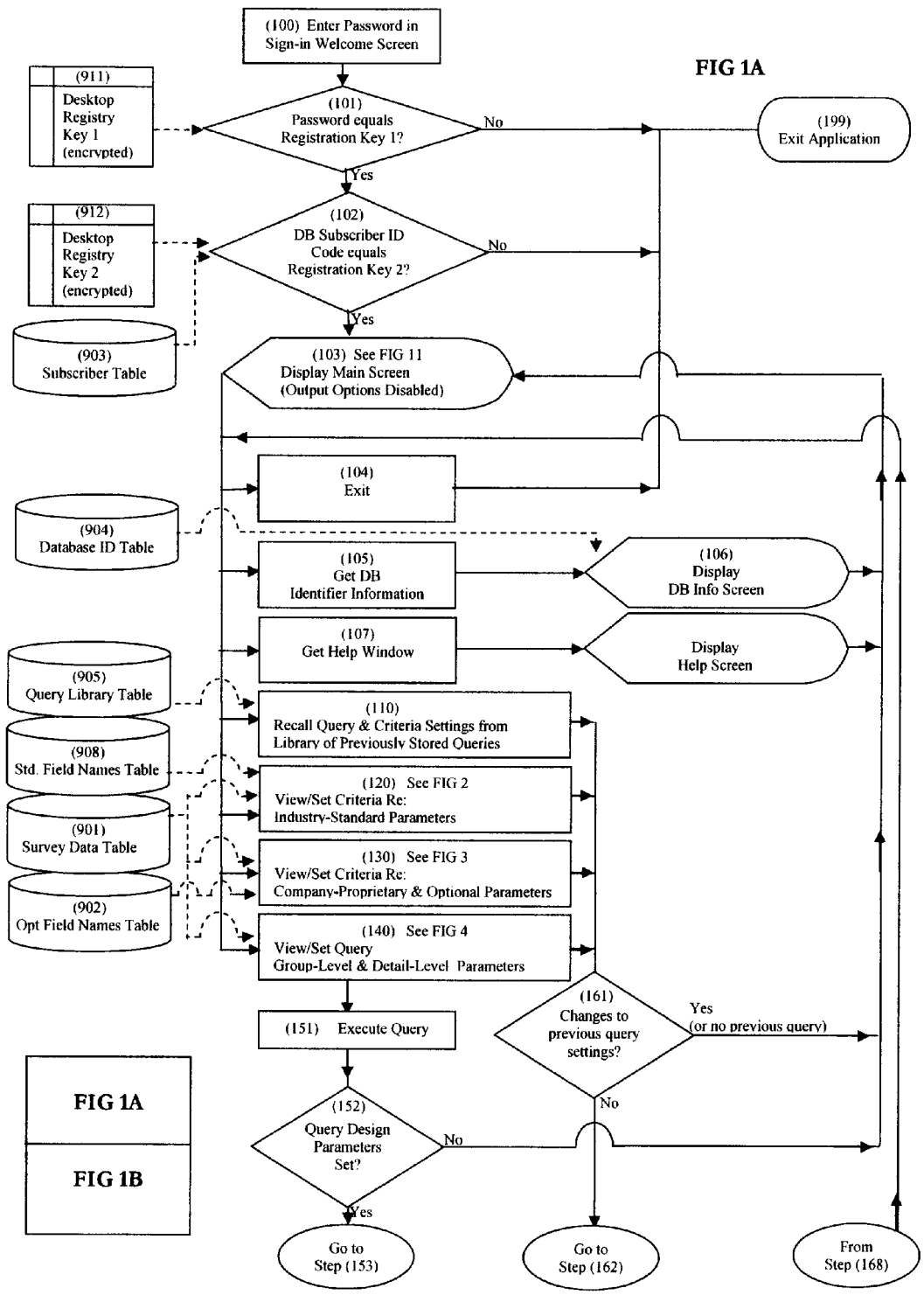

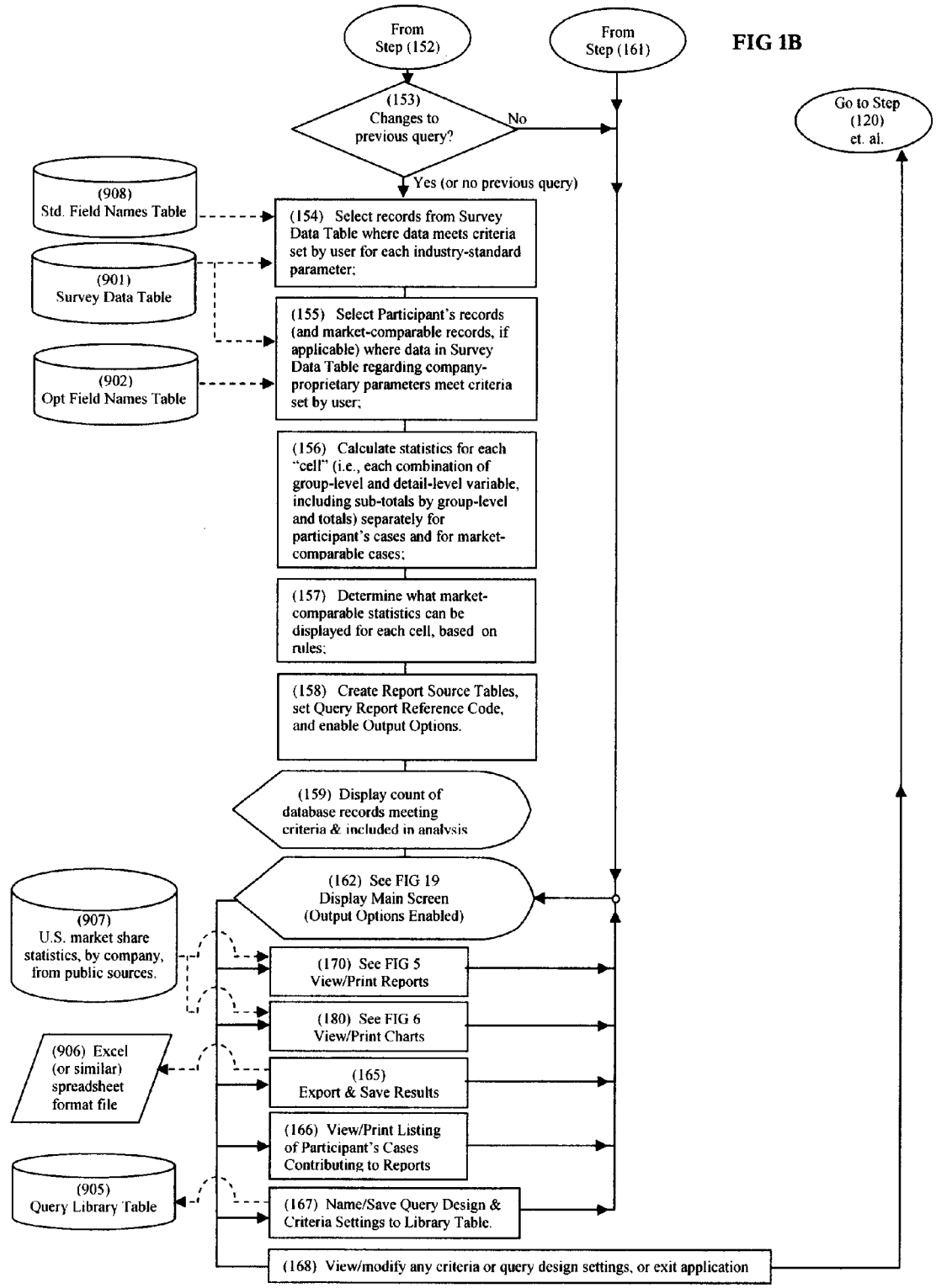

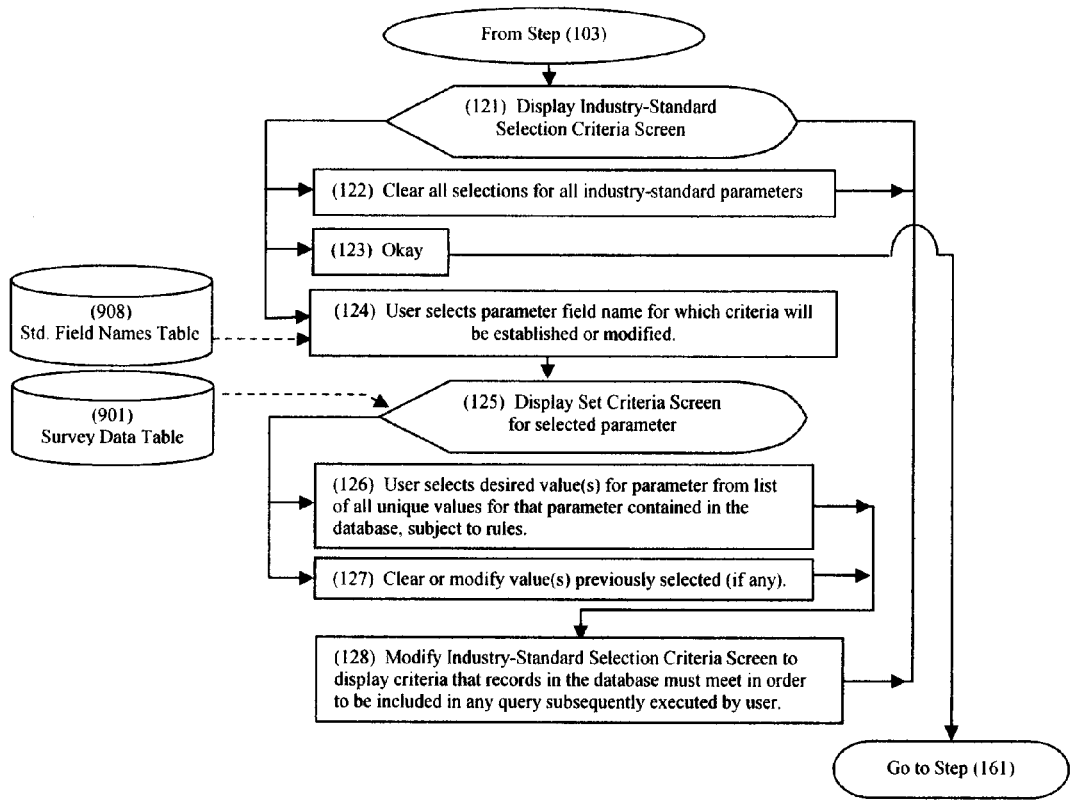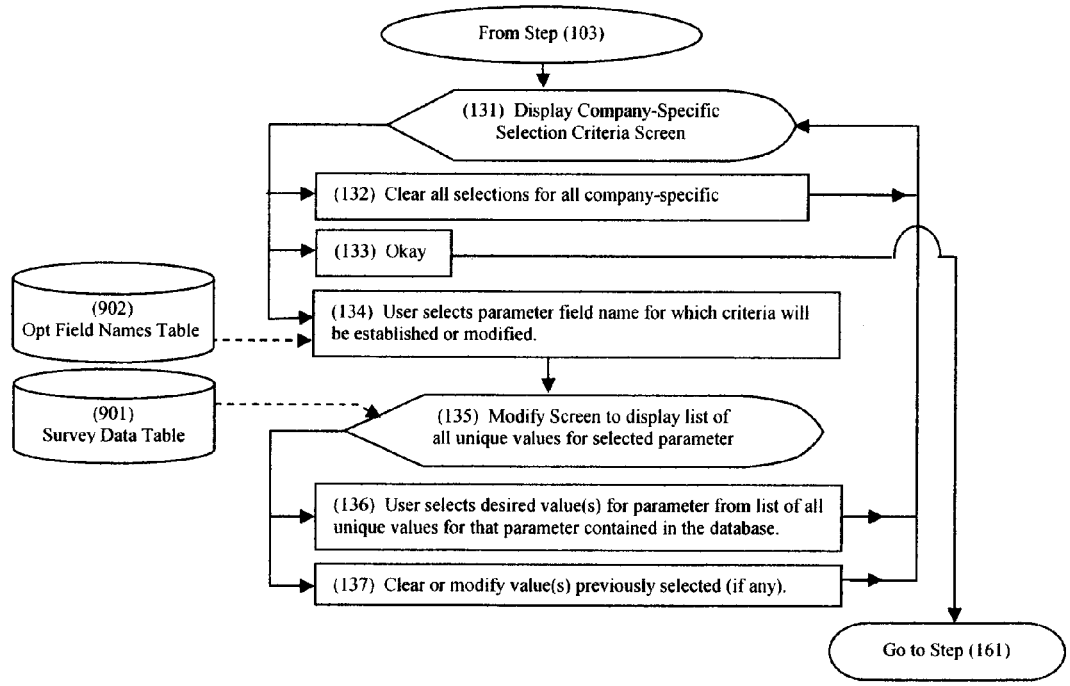

FIG 9

DESCRIPTIVE LEGEND: GRAPHICAL DRAWING SYMBOLS USED

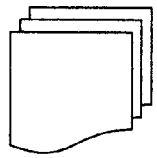 Records in disparate formats, in document or electronic form.

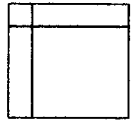 Internal storage on client desktop computer.

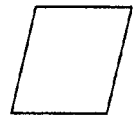 Data file in electronic spreadsheet format.

 Direct-access data stored as tables in a secure database that can be read or written into only by the invention.

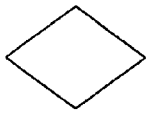 Decision

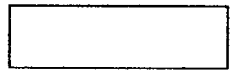 Action performed by user, or a process performed by the invention as a result of user action.

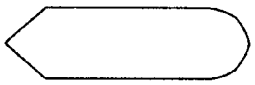 Display or update a screen image for user interaction.

FIG 13

Select a Stored Query:

| Date | Ref Code | Query Description |
|---|---|---|
| 6/30/2003 | ZD292 | Selected SIC Sectors in Large Midwest MSAs |
| 6/30/2003 | YU354 | Selected SICs within Selected MSAs |
| 3/2/2003 | GM014 | Max Benefit Amt for Health Services |
| 3/2/2003 | GM013 | Sales Region for Selected SIC Sectors |
| 3/2/2003 | GM012 | Computer-Related SICs in Selected States |
| 3/2/2003 | GM011 | Rate Structure by Elim Period & Ben Percent |

(325)
(326) [Find ....] [Delete]   [Select] [Close]
(327)

Set Criteria for Cases Included in Report:                    [Help]

Effective Dates:  Beginning [1/1/2001]  and Ending [6/1/2002]  (inclusive)

Plan Characteristics:

- Benefit Percentage
- Max Benefit Period
- Max Benefit Amount:  [$5,000 ▼] to [$12,000 ▼]
- SS Integration
- Own Occ Period
- Elim Period
- Contributory
- Min Benefit Amount
- Product Type — True Group (Default)
- Policy Status — All Sold Cases (Default)

Demographic Characteristics:

- No. Lives at Issue: [10] to [250]
- State(s)
- MSA(s)
- Industry Group(s)

[Okay] [Reset All]

Group Long Term Disability Source Data Information for Pinnacle L&C
Data Grouped by: SIC Code Within MSACode Data For: Pinnacle L&C

| | Number of Cases | Lives | Annual Premium Sold | Annual Premium Formula | Annual Premium Ratio | Per Life | Mo CP Per Life | Avg Rate Sold | Avg Rate Formula | Avg Rate Ratio | Std Dev |
|---|---|---|---|---|---|---|---|---|---|---|---|
| MSACode Boston-Worcester-Lawrence, MA-NH-ME-CT | | | | | | | | | | | |
| 7371: Computer Programming Services | 2 | 87 | $24,588 | $28,536 | 86.2% | $283 | $7,080 | 0.34% | 0.39% | 86.3% | 0.06% |
| 8711: Engineering Services | 1 | 215 | $50,156 | $65,352 | 76.7% | $233 | $5,007 | 0.39% | 0.51% | 76.7% | |
| 8721: Accounting, Auditing, and Bookkeeping Services | 2 | 43 | $10,570 | $13,344 | 79.2% | $246 | $4,414 | 0.51% | 0.62% | 81.1% | 0.17% |
| > > Group Totals | 5 | 345 | $85,314 | $107,232 | 79.6% | $247 | $5,456 | 0.41% | 0.51% | 81.9% | 0.12% |
| MSACode Phoenix-Mesa, AZ | | | | | | | | | | | |
| 7371: Computer Programming Services | 1 | 105 | $18,630 | $19,668 | 94.7% | $177 | $6,982 | 0.21% | 0.22% | 94.7% | |
| 8721: Accounting, Auditing, and Bookkeeping Services | 1 | 25 | $5,282 | $5,916 | 89.3% | $211 | $5,986 | 0.29% | 0.33% | 89.3% | |
| > > Group Totals | 2 | 130 | $23,913 | $25,584 | 93.5% | $184 | $6,791 | 0.25% | 0.28% | 91.5% | 0.06% |
| MSACode > > > TOTALS | | | | | | | | | | | |
| 7371: Computer Programming Services | 3 | 192 | $43,218 | $48,204 | 89.7% | $225 | $7,027 | 0.29% | 0.33% | 88.2% | 0.08% |
| 8711: Engineering Services | 1 | 215 | $50,156 | $65,352 | 76.7% | $233 | $5,007 | 0.39% | 0.51% | 76.7% | |
| 8721: Accounting, Auditing, and Bookkeeping Services | 3 | 68 | $15,852 | $19,260 | 82.3% | $233 | $4,992 | 0.44% | 0.53% | 82.8% | 0.17% |
| > > Group Totals | 7 | 475 | $109,227 | $132,816 | 82.2% | $230 | $5,821 | 0.37% | 0.44% | 83.6% | 0.13% |

Monday, July 14, 2003     Strictly Confidential Information. Property of Pinnacle Life & Casualty     Page 2 of 2
Report Reference Code: BO896     Calculation of average rate statistics ignore extreme outlier cases

FIG 30

Group Long Term Disability Source Data Information for Pinnacle L&C
Data Grouped by: SIC Code Within MSACode
(435)

Data For:Market Comparables

| | Number of Contributors | Cases | Lives | Annual Premium Sold | Annual Premium Formula | Annual Premium Ratio | Per Life | Mo CP Per Life | Avg Rate Sold | Avg Rate Formula | Avg Rate Ratio | Std Dev |
|---|---|---|---|---|---|---|---|---|---|---|---|---|
| MSACode Boston-Worcester-Lawrence, MA-NH-ME-CT | | | | | | | | | | | | |
| 7311: Advertising Agencies | <3 | <5 | | | | | | | | | | |
| 7371: Computer Programming Services | 6 | 66 | 2,814 | $575,159 | | | $204 | $6,548 | 0.29% | | | 0.11% |
| 8711: Engineering Services | 6 | 28 | 1,250 | $227,122 | | | $182 | $4,728 | 0.38% | | | 0.15% |
| 8721: Accounting, Auditing, and Bookkeeping Services | 5 | 11 | 260 | $68,381 | | | $263 | $4,998 | 0.43% | | | 0.13% |
| > > Group Totals | 6 | 108 | 4,393 | $886,153 | | | $202 | $5,923 | 0.33% | | | 0.13% |
| MSACode Phoenix-Mesa, AZ | | | | | | | | | | | | |
| 7311: Advertising Agencies | <3 | <5 | | | | | | | | | | |
| 7371: Computer Programming Services | 3 | 12 | 527 | $109,900 | | | $209 | $5,604 | 0.30% | | | 0.07% |
| 8711: Engineering Services | <3 | <5 | | | | | | | | | | |
| 8721: Accounting, Auditing, and Bookkeeping Services | <3 | <5 | | | | | | | | | | |
| > > Group Totals | 4 | 18 | 679 | $140,209 | | | $206 | $5,650 | 0.32% | | | 0.10% |
| MSACode  > > > TOTALS | | | | | | | | | | | | |
| 7311: Advertising Agencies | <3 | <5 | | | | | | | | | | |
| 7371: Computer Programming Services | 6 | 78 | 3,341 | $685,059 | | | $205 | $6,399 | 0.29% | | | 0.10% |
| 8711: Engineering Services | 6 | 31 | 1,331 | $240,419 | | | $181 | $4,844 | 0.37% | | | 0.15% |
| 8721: Accounting, Auditing, and Bookkeeping Services | 5 | 13 | 303 | $76,966 | | | $254 | $5,022 | 0.42% | | | 0.13% |
| > > Group Totals | 6 | 126 | 5,072 | $1,026,361 | | | $202 | $5,887 | 0.33% | | | 0.13% |

Monday, July 14, 2003        Strictly Confidential Information. Property of Pinnacle Life & Casualty        Page 2 of 2
Report Reference Code: B0896        Calculation of average rate statistics ignore extreme outlier cases

FIG 31

Group Long Term Disability Source Data Information for Pinnacle L&C
Data Grouped by: SIC Code Within MSACode

| | | Number of | | Annual Premium | | | Mo CP | Avg Rate | | Std |
|---|---|---|---|---|---|---|---|---|---|---|
| | Contributors | Cases | Lives | Sold | Formula | Ratio | Per Life | Per Life | Sold Formula | Ratio | Dev |

MSACode  Boston-Worcester-Lawrence, MA-NH-ME-CT

| | | | | | | | | | | | |
|---|---|---|---|---|---|---|---|---|---|---|---|
| 7311: Advertising Agencies | Market Comparables | <3 | <5 | | | | | | | | |
| 7371: Computer Programming Services | Pinnacle L&C | 2 | 87 | $24,588 | $28,536 | 86.2% | $283 | $7,080 | 0.34% | 0.39% | 86.3% | 0.06% |
| | Market Comparables | 66 | 2,814 | $575,159 | | | $204 | $6,548 | 0.29% | | | 0.11% |
| 8711: Engineering Services | Pinnacle L&C | 1 | 215 | $50,156 | $65,352 | 76.7% | $233 | $5,007 | 0.39% | 0.51% | 76.7% | |
| | Market Comparables | 28 | 1,250 | $227,122 | | | $182 | $4,728 | 0.38% | | | 0.15% |
| 8721: Accounting, Auditing, and Bookkeeping Services | Pinnacle L&C | 2 | 43 | $10,570 | $13,344 | 79.2% | $246 | $4,414 | 0.51% | 0.62% | 81.1% | 0.17% |
| | Market Comparables | 11 | 260 | $68,381 | | | $263 | $4,998 | 0.43% | | | 0.13% |
| > > Group Totals | Pinnacle L&C | 5 | 345 | $85,314 | $107,232 | 79.6% | $247 | $5,456 | 0.41% | 0.51% | 81.9% | 0.12% |
| | Market Comparables | 108 | 4,393 | $886,153 | | | $202 | $5,923 | 0.33% | | | 0.13% |

MSACode  Phoenix-Mesa, AZ

| | | | | | | | | | | | |
|---|---|---|---|---|---|---|---|---|---|---|---|
| 7311: Advertising Agencies | Market Comparables | <3 | <5 | | | | | | | | |
| 7371: Computer Programming Services | Pinnacle L&C | 1 | 105 | $18,630 | $19,668 | 94.7% | $177 | $6,982 | 0.21% | 0.22% | 94.7% | |
| | Market Comparables | 12 | 527 | $109,900 | | | $209 | $5,604 | 0.30% | | | 0.07% |
| 8711: Engineering Services | Market Comparables | <3 | <5 | | | | | | | | |
| 8721: Accounting, Auditing, and Bookkeeping Services | Pinnacle L&C | 1 | 25 | $5,282 | $5,916 | 89.3% | $211 | $5,986 | 0.29% | 0.33% | 89.3% | |
| | Market Comparables | <5 | | | | | | | | | |
| > > Group Totals | Pinnacle L&C | 2 | 130 | $23,913 | $25,584 | 93.5% | $184 | $6,791 | 0.25% | 0.28% | 91.5% | 0.06% |
| | Market Comparables | 18 | 679 | $140,209 | | | $206 | $5,650 | 0.32% | | | 0.10% |

(440) → Pinnacle L&C (Engineering Services row)
(441) → Market Comparables (Engineering Services row)

Monday, July 14, 2003   Strictly Confidential Information. Property of Pinnacle Life & Casualty   Page 2 of 3
Report Reference Code: B0896   Calculation of average rate statistics ignore extreme outlier cases

FIG 32

Group Long Term Disability Source Data Information for Pinnacle L&C
Data Grouped by: SIC Code Within MSACode

| | | Number of | | Annual Premium | | | Mo CP | Avg Rate | | | Std |
| | | Contributors Cases Lives | | Sold | Formula | Ratio | Per Life | Per Life | Sold | Formula | Ratio | Dev |
|---|---|---|---|---|---|---|---|---|---|---|---|---|

MSACode > > > TOTALS (442)

| | | Contributors | Cases | Lives | Sold | Formula | Ratio | Per Life | Per Life | Sold | Formula | Ratio | Dev |
|---|---|---|---|---|---|---|---|---|---|---|---|---|---|
| 7311: Advertising Agencies | Market Comparables | <3 | <5 | | | | | | | | | | |
| 7371: Computer Programming Services | Pinnacle L&C | 3 | 192 | $43,218 | $48,204 | 89.7% | $225 | $7,027 | 0.29% | 0.33% | 88.2% | 0.08% |
| | Market Comparables | 6 | 78 | 3,341 | $685,059 | | $205 | $6,399 | 0.29% | | | 0.10% |
| 8711: Engineering Services | Pinnacle L&C | 1 | 215 | $50,156 | $65,352 | 76.7% | $233 | $5,007 | 0.39% | 0.51% | 76.7% | |
| | Market Comparables | 6 | 31 | 1,331 | $240,419 | | $181 | $4,844 | 0.37% | | | 0.15% |
| 8721: Accounting, Auditing, and Bookkeeping Services | Pinnacle L&C | 3 | 68 | $15,852 | $19,260 | 82.3% | $233 | $4,992 | 0.44% | 0.53% | 82.8% | 0.17% |
| | Market Comparables | 5 | 13 | 303 | $76,966 | | $254 | $5,022 | 0.42% | | | 0.13% |
| > > Group Totals | Pinnacle L&C | 7 | 475 | $109,227 | $132,816 | 82.2% | $230 | $5,821 | 0.37% | 0.44% | 83.6% | 0.13% |
| | Market Comparables | 6 | 126 | 5,072 | $1,026,361 | | $202 | $5,887 | 0.33% | | | 0.13% |

Monday, July 14, 2003  Strictly Confidential Information. Property of Pinnacle Life & Casualty  Page 3 of 3
Report Reference Code: B0896  Calculation of average rate statistics ignore extreme outlier cases

SYSTEM AND METHOD FOR OBTAINING, EVALUATING, AND REPORTING MARKET INFORMATION

BACKGROUND OF THE INVENTION

1. Field of the Invention

This invention relates to systems and methods for collecting proprietary market information from a group of cooperating companies who are otherwise competitors, for making statistics compiled from that data available to those companies in electronic format, for providing each company with flexible, interactive data mining access to such statistics, and for protecting the confidentiality of each company's proprietary market information.

2. Background Description

Business managers must have sufficient relevant information regarding their businesses and their competitors' businesses in order to make useful decisions and plans. That information should be as readily available to the manager as possible. In addition, that information must be parseable in selectable ways and suitable for reasonable relevant analysis. Service providers exist who claim to offer consulting and database access services that provide what the manager needs. However, in a number of industries, including in the field of service providers, such as insurance providers, it can be difficult to get a complete picture of the market and its segments due to the difficulties one can expect in trying to get competitors to disclose to each other, directly or indirectly, relevant private information. It is the availability of such comprehensive information that can enable a business manager to become more effective in maximizing the use of the company's resources.

There presently does not exist a system for management to have cost-effective ownership of interactive access to detailed relevant market information made available by others in the same industry through a secure survey system. In addition, there is presently no system that enables the manager to analyze that data or information in a customized manner. Instead, there are only intermediates and consultants that compile static reports about the marketplace as a whole, and prevent insight into the data behind those static reports. It would be preferable to permit relevant industry survey participants to refine and customize their analyses without having to go back to the third-party intermediary or consultant to request further analyses, at further cost.

Importantly, managers need a rational scientific basis for determining their company's competitive position and trends affecting competitive position using robust, reliable, current data. Such information is critical if management is to quickly recognize and effectively adapt to competitive challenges in the markets and market segments in which it competes. What is needed is a system that enables a company to achieve cross-functional coordinated competitive strategy, distribution improvements and resource allocation based on comprehensive information and consistent definitions rather than anecdotal information collected from various functional areas with different perspectives.

In particular, there presently does not exist a system that establishes a mechanism for companies to share anonymously detailed proprietary sales transaction data in order to create a detailed, reliable database of market activity statistics accessible to all participants, while at the same time protecting the anonymity of each company's data and their competitive position. For a company to participate and make such a system possible, the company must perceive that the value of information gained exceeds the value of information given and the cost of compiling and providing that information. What is needed is a system that enables the company to gain access to a customized market transaction database many times greater than its own transaction database as the incentive to provide to that database its own sensitive information. For that, each company must be assured of being only one anonymous contributor to any statistic seen by other companies on their customized databases. The system must be configured so that each company's highly confidential data must be accessible by that company only.

A system of comprehensive market/industry information would be of value to the manager; however, it must also be configured for ease of use such that the inputted information is relevant. That is, the system must address the need for an interactive, non-difficult interface that provides access to extensive, detailed market information by a broad range of non-technical users from various functional areas of the company, thus increasing its use in decision-making and its impact on company results. For example, the system should allow company management to focus on areas of proprietary interest, unconstrained by standardized survey reports that all participants would otherwise share. What is needed is something other than the existing type of resource in which fixed information of limited value is accessible in a limited manner. Such a system should permit each participating provider with the capability to access and analyze the survey data so that it may study and identify particular niches of competitive advantage or disadvantage with total anonymity, thereby maximizing proprietary insight. The result would be enhanced product innovation, ability to compete, and choices for consumers.

Business managers need to research markets where the company does not have any exposure or cost data available to the company is too sparse to be credible. Information regarding the characteristics of markets the company's distribution system does not access or of consumers who buy elsewhere (i.e., information it can not develop from internal data) helps the company identify growth opportunities. Currently, companies are unable to gain access to detailed information regarding characteristics of markets where they do not have exposure. A fair system for providing such access would require the company to provide information regarding those same characteristics of markets where they do have exposure. An effective system including comprehensive information would provide detailed market price information as a proxy for cost data in markets where the company does not have credible cost data upon which to rely and to determine what is required to make a successful entry into that market.

As indicated, a system enabling company access to detailed relevant market information in a form that permits customized analysis must include participation by the interested companies. It must also enable the company to discover and build on competitive advantages while protecting itself against the risk of anti-selection—that is, the risk that a company will unwittingly market a product that is competitively appealing to clients with higher cost characteristics than assumed in its pricing. Presently, no system is known to exist that enables a company to comprehensively map sales performance and pricing levels relative to market norms for detailed segments of its business. If such a system did exist, a company could quickly identify and categorize outliers as either problems or discovered niches of competitive advantage. The consumer would benefit from a company's lower exposure to costly mistakes and faster recognition of competitive opportunities.

As noted, company participation would ordinarily not be forthcoming from any companies seeking to protect their own sensitive information. However, it is necessary for many or all market participants to provide their useful information. If all are reluctant to reveal that information for fear of its access by a competitor, they are unlikely to provide it. For that reason, the system must address the need to protect a participating company's data security, minimize demand on a participating company's available information technology resources while implementing the invention, and efficiently deliver updates to multiple users. The system should be configured in a manner that does not require the company to buy or install any additional computing resources apart from the system itself. The system should be installable by users on one or more computing devices under the control of the company using the system. Updates to the company's customized database could be received as unsecured e-mail attachments and easily installed by the user, yet an encrypted security method would ensure that such updates can only be installed and accessed on personal computers authorized by the intended company.

What is needed is a system that addresses the need for an electronic download of survey data that can interface with other company-specific business analysis systems regarding profitability, distribution efficiency, and market potential, etc. in order to build integrated business optimization models.

SUMMARY OF THE INVENTION

It is an object of this invention to provide a system and method of compiling detailed survey data in electronic format and to provide the survey participants with the interactive ability to analyze that data down to very detailed levels of their own design while preventing any survey participant from viewing data that allows attribution back to the company supplying that information. Each participating company can create statistics regarding their own data and view their own data and can create statistics regarding data for the aggregate of all other participating companies. However, they cannot view the data supplied in a manner that enables attribution of the particular data from one of the other participating companies.

It is another object of this invention to automate rules that require a minimum spread of survey respondents and a minimum number of data records before statistics are displayed regarding the aggregate of all other survey respondents. This prevents survey participants, who are otherwise competitors, from drilling down so deeply into the survey responses that they can study specific competitors in particular market/product cells. This eliminates the need and expense for an independent third-party intermediary to ensure that participants can not inappropriately study each other's competitive position.

It is another object of this invention to provide an easy, point-and-click interface between the user and the database of market statistics that allows a non-technical user to drill down to and isolate very specific segments of the detailed database and then generate a multi-dimension analysis for combinations of variables using the invention's integrated flexible reporting and charting utilities.

It is another object of this invention to provide the user with the ability to download statistics into electronic spreadsheet files so that the user can link these statistics with results from other proprietary information (e.g., profitability analysis, sales quote/sold analysis, market potential data) as well as other graphing software.

The present invention includes a method for providing to one or more contributors information related to the goods or services offered by the contributors, the method comprising the steps of compiling the information related to the goods or services offered by the one or more contributors; creating an information database of the compiled information, wherein the information database is segregated for each of the contributors into a first information group of the information related only to an individual contributor seeking access to the information database and a second information group of the information related to all other contributors; and enabling each of the one or more contributors to access its own first information group, and to access the second information group without permitting any of the one or more contributors to determine which of the other contributors provided what information of the second information group.

Further, the invention includes the optional step of denying to a particular contributor access to selected information from the second information group if that particular contributor does not provide the same selected information of its own. It also optionally enables the contributors to access and query the database directly for specific market information of interest. The method includes the optional step of enabling each of the contributors to define a query of the compiled information based on individual portions of the information or selectable combinations of individual portions of the information to create unique outcomes and to generate statistics based upon the outcomes obtained based upon the query. The method further includes the option of generating statistics for each contributor for information related only to the first information group and then determining with respect to the second information group that a defined minimum amount of the information related to the particular query made by the querying contributor exists. If so, the requested information is presented to the querying contributor statistical information only for defined information of the first information group and of the second information group that meets the minimum amount established by the third party administrator.

Additionally, the method of the present invention includes the optional step of enabling a contributor seeking access to the information database to do so through a graphical user interface represented on a display of a computing device through which the contributor accesses the information database by configuring one or more outputs of the information accessed into summary representations, and to present a summary depiction of database query options and queries made. The interface is also configured by the method of the present invention to eliminate from display in a query interface display a query option that is not applicable to the defined portion of information to be queried. The querying method of the present invention forms part of a computer program that may operate on a computing system of the contributor independent of any other programs running on the same computing system. It further optionally includes the step of establishing standardized query formats and output formats selectable by the querying contributor.

The method of the present invention is carried out using a computing means controlled by a computer programming performing the steps associated with the method of the invention. The system includes a graphical user interface system configured to enable one or more users to observe one or more summary representations of one or more sets of information stored in the computing system, wherein the one or more summary representations are observable on the display of a computing device. The graphical user interface system includes a computer program configured to display on the display of the computing device one or more screen representations of information selection options and, for at least one of the information selection options, adjacent to the at least one information selection options, a representation of an information selection previously made.

These and other advantages and features of the system and method of the present invention will become apparent to those skilled in the art upon review of the following detailed description, the accompanying drawings and the appended claims.

BRIEF DESCRIPTION OF THE DRAWINGS

FIG. 1 comprising FIG. 1A and FIG. 1B, taken together, present in flowchart format an overview of the method, options and processes initiated by the user, and data sources employed by the method.

FIG. 2 is a flowchart diagram of the process, referred to in FIG. 1A, by which the user defines selection criteria regarding industry-standard features for database records to be included in a subsequent query.

FIG. 3 is a flowchart diagram of the process, referred to in FIG. 1A, by which the user defines selection criteria regarding company-specific features for database records to be included in a subsequent query.

FIG. 9 is a descriptive legend that defines the graphical drawing symbols used in the preceding flow charts.

FIG. 13 is an example of the user-interface screen, referred to in FIG. 1A, displayed in response to the user requesting the option to recall a previously stored query from the Query Library Table.

FIG. 14 is an example of the user-interface screen, referred to in FIG. 2, displayed in response to the user initiating the option, from the screen of FIG. 11, to set or view industry-standard criteria for records included in a subsequent query.

FIG. 29 is an example of a report format that displays query results showing statistics regarding the company for which the database was customized, displayed in response to the user initiating the option, from the screen of FIG. 22, to view output in "Company-Level" Format.

FIG. 30 is a continuation of the report format shown in FIG. 29, showing statistics regarding the aggregate of all participants other than the company for which the database was customized.

FIG. 31 is an example of a report format that displays query results showing statistics, displayed in response to the user initiating the option, from the screen of FIG. 22, to view output in "Detail-Level" Format.

FIG. 32 is a continuation of the report format shown in FIG. 31, showing subtotals and totals across all of the cells defined by the query.

DETAILED DESCRIPTION OF THE PREFERRED EMBODIMENTS

Figure 4:
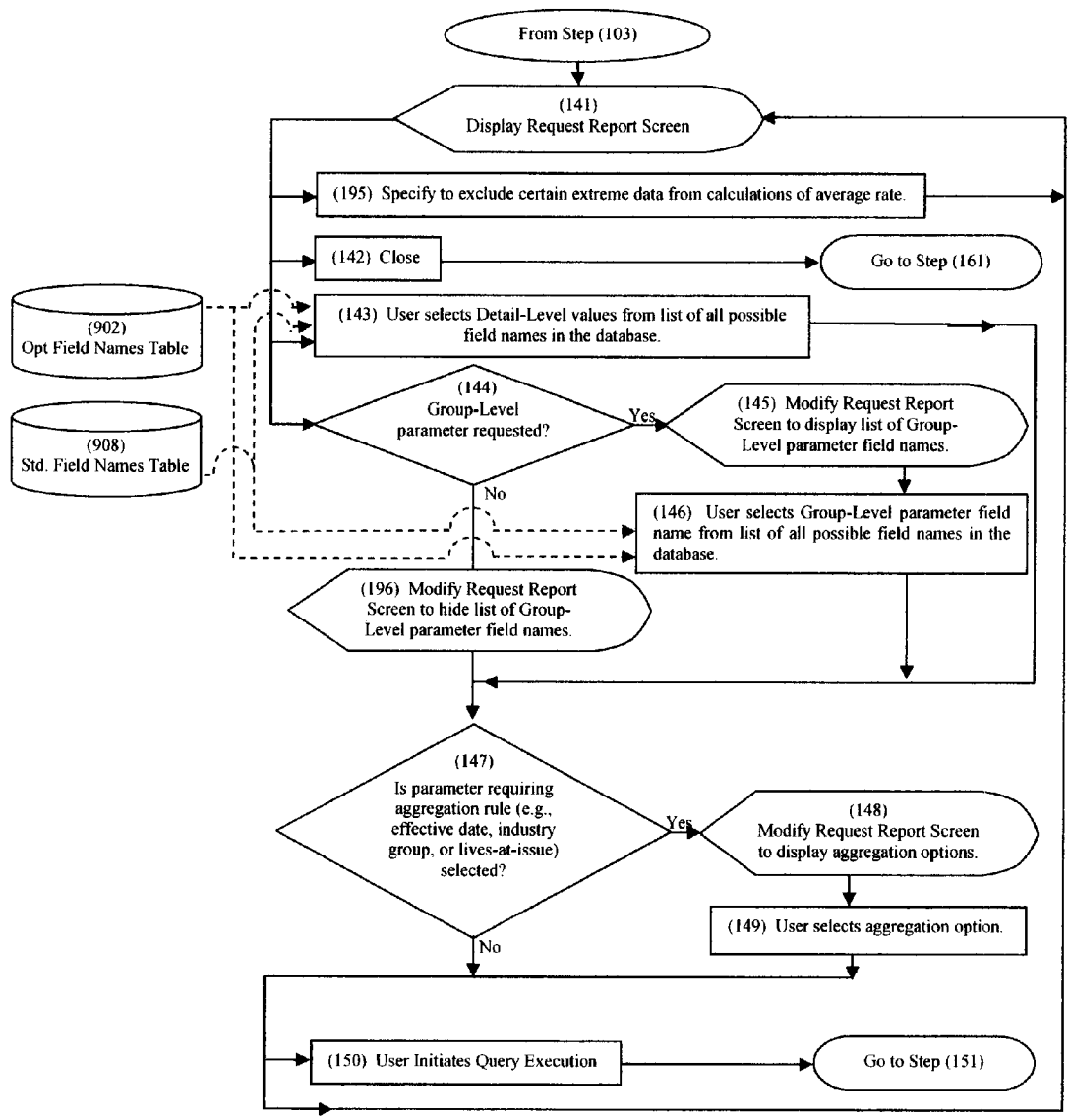
FIG. 4 is a flowchart diagram of the process, referred to in FIG. 1A, by which the user defines the query to be executed.

The present invention is a system and related process or method involving the use of computing means, such as one or more computers, configured with a computer program application, to enable participating providers or "contributors" (as defined herein) to obtain and analyze relevant market data. In the following description, the operation of the computer program application is represented by a series of flowcharts forming part of this description. A user authorized by a particular contributor interacts with the computing means through graphical user interfaces illustrated in representative screen shots also forming part of this description. Upon review of this written description, the flowcharts and the screenshots, those skilled in the art of computer programming are enabled to reproduce the system and process of this invention using a programming system of choice. One such programming system found to be satisfactory for this purpose is Microsoft Access™, but is not limited thereto.

The system of the present invention involves three primary components: an information database, a formatted query storage program, and the database evaluation and reporting program referenced above. These three primary components are remotely or locally stored and are preferably accessed by one or more system users through one or more computing devices. The computing devices must include a visual display for observing a graphical user interface and one or more inputting components, such as a mouse and keyboard, to interact with the evaluation and reporting program. The information database is populated with information relevant to the particular contributor and the particular market or markets serviced by the contributor. The information is obtained by a third-party administrator from an array of sources including, but not limited to, system contributors and public resources, including resources of public information regarding contributors and non-contributors of the relevant market. For each contributor, the information database is divided into a first information group and a second information group. The first information group includes the information related only to that contributor. The second information group includes information related to all other contributors and any non-contributors having information relevant to that contributor's market.

In the present embodiment of the invention, the evaluation and reporting program is controlled by the third-party administrator such that contributors may access the program in the manner to be described herein, and with that the information database, but they cannot modify either one. It is contemplated that a contributor may be able to modify or have modified the information database related to information provided by that contributor and, in limited instances, the evaluation and reporting program to analyze the information of the information database in ways that may not be available through the program.

FIGS. 1A and 1B, taken together, represent the process by which a user of the invention authorized by a contributor defines what portions of the database information to query, defines how the data will be grouped into cells for the purpose of calculating statistics, and chooses output options. A main screen offers only valid navigation options at any point in the process while providing flexibility to control settings and to view or modify previous settings in any sequence. Navigation is by graphic-user interface (e.g., point-and-click) activation of buttons and selection of values from lists of valid choices created from the database.

Data sources, customized for the participating company, are shown on the left and the points where the process uses the data are indicated by dashed lines. The data sources are tables of data contained in databases located where they can be accessed by the process. Detailed data in the databases can only be accessed through the software/application program, which allows the user to view information only according to design of the invention and subject to rules established by the third-party administrator. Certain tables (901, 902, 903, 904, 907, and 908) are contained in the customized database which is updated from time to time with a new customized database provided by the third-party administrator. The query library table (905) is contained in a separate database where each user accumulates their own table of stored query settings. The steps associated with creating the tables contained in the customized database are drawn in FIG. 8 and are described in more detail below.

It will make the description easier to understand if certain terminology used throughout the description is defined:

(a) Third-party administrator—Independent person who compiles data from companies participating in a survey, provides each participating company with a customized database, initializes installations of the software, and establishes rules regarding how query results can be viewed by users;

(b) Contributors—All companies supplying data compiled by the third-party administrator;

(c) Company—A particular contributor company for which the database has been customized;

(d) Market-Comparable—Related to the aggregate of all contributors other than the company;
(e) User—Person authorized to use the software to view query results from a company's customized database;
(f) Database—A collection of tables of data;
(g) Customized database—A collection of tables of data that can be accessed only through the software and that, in particular, has been customized to identify the company's survey data records separately from the survey data records of all other contributors;
(h) Process—The computer-enabled method by which data in the customized database is accessed and the results of queries are generated;
(i) Parameter—A feature (e.g., maximum benefit amount) used to describe the characteristics of records in the survey data;
(j) Value—Data entry for a parameter in any particular record;
(k) Criteria—Values of a parameter that specify which records in the customized database will be included in a query;
(l) Query Design—Parameters (e.g., maximum benefit amount and region) that describe the combinations of values for which query results are generated;
(m) Cell—A unique combination of values for which query results are generated;
(n) Query Settings—The collection of criteria and query design that, taken together, define the scope and form of a query calculation process.

In the drawings, the name of a fictional company is used. The statistics displayed in drawings of reports and charts are representative of the types of statistics generated by the invention, but the statistics themselves are not real. In any of the flowchart diagrams referred to in this description, the graphical drawing symbols used are defined in the legend (FIG. 9).

Figure 10:
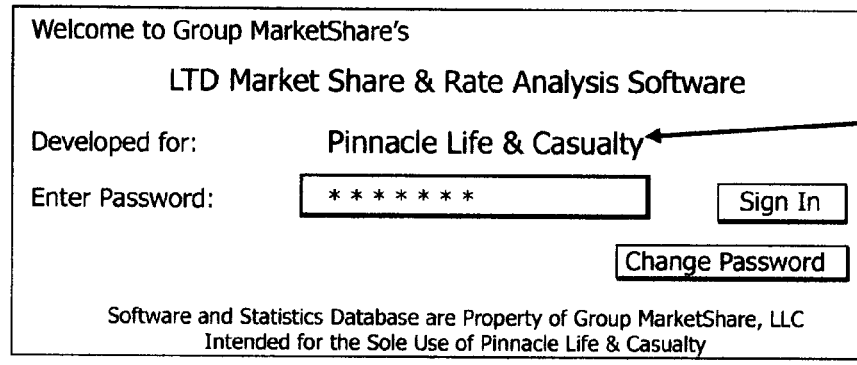
FIG. 10 is an example of the user-interface screen that requires the user to supply a valid password in order to access and use the invention.

In FIG. 1A, the user enters a password (100) to initiate the process using the sign-in screen (FIG. 10). The process checks (101) the password against the valid password stored in encrypted form (911) in the computer's operating system registry. The process also checks (102) that the computer is authorized to access data from the customized database stored on the computer by matching the company code stored in encrypted form in the computer's operating system registry (912) with company information stored on the customized database (903). Thus, it is established that the user is authorized to execute the process on that particular computer and that particular computer is authorized to access the particular customized database. Failure on any of these tests exits the process automatically (199).

Figure 11:
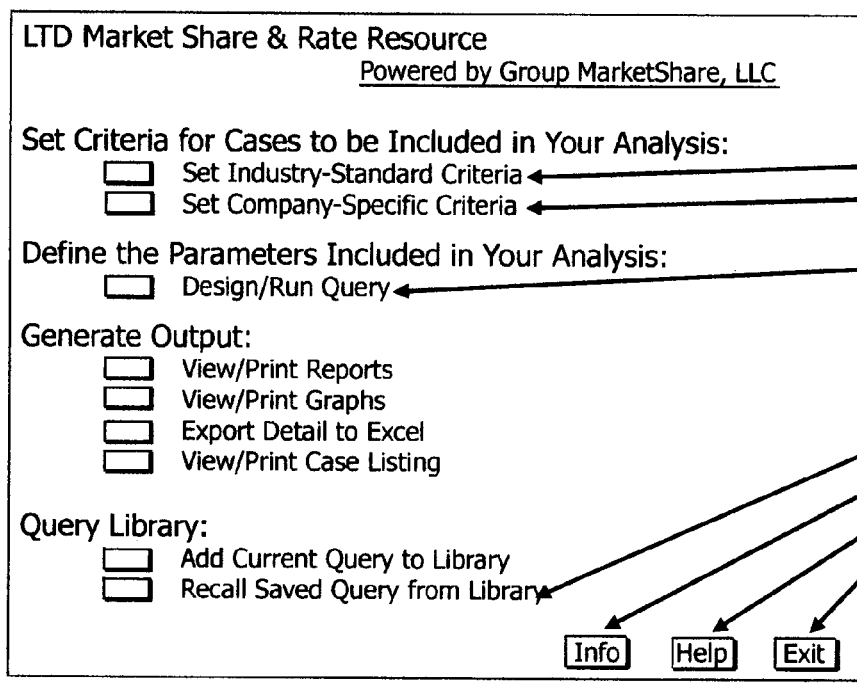
FIG. 11 is the main user-interface screen, referred to in FIG. 1A, from which the user navigates in order to define data criteria, define queries, and recall query designs.
Figure 12:
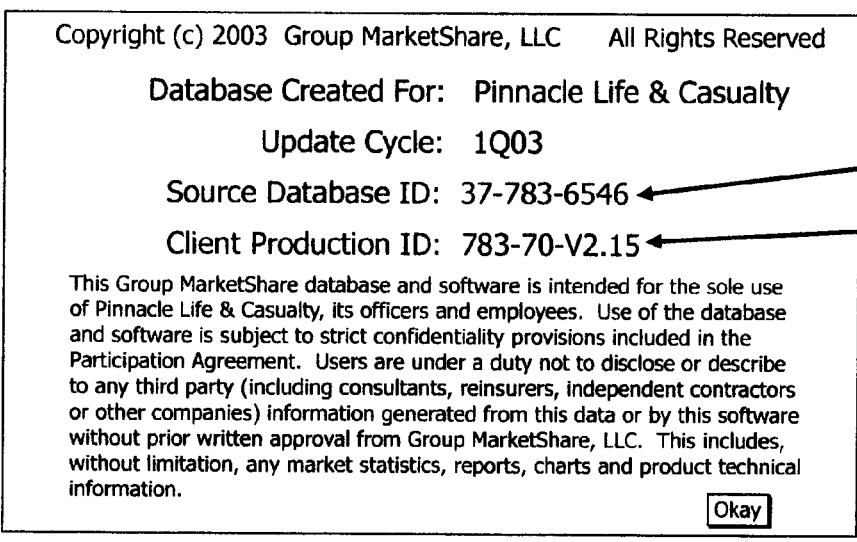
FIG. 12 is an example of the user-interface screen, referred to in FIG. 1A, displayed in response to the user requesting database identifier information.
Figure 17:
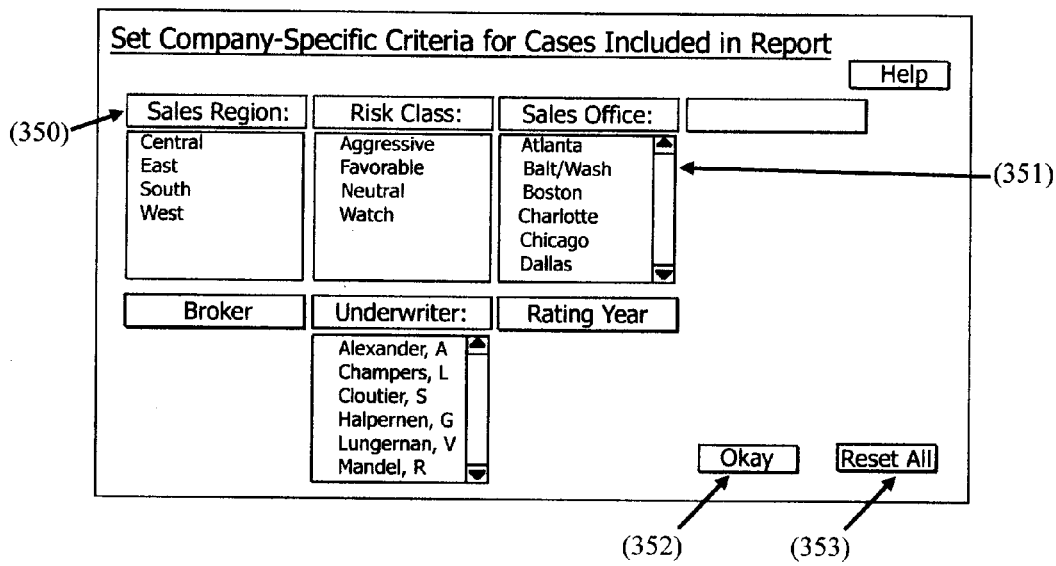
FIG. 17 is an example of the user-interface screen, referred to in FIG. 3, displayed in response to the user initiating the option, from the screen of FIG. 11, to set or view company-specific criteria for records included in a subsequent query.
Figure 18:
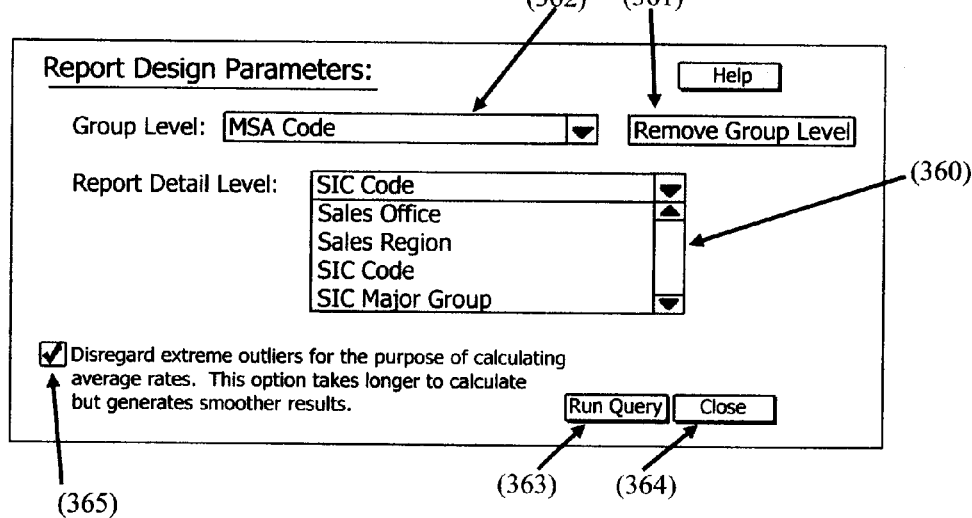
FIG. 18 is an example of the user-interface screen, referred to in FIG. 4, displayed in response to the user initiating the option, from the screen of FIG. 11, to view or set query parameters.

The process displays (103) the main screen (FIG. 11) which shows options available to the user at this point. Available options, which can be executed in any order, include:
(a) Exit the process (104);
(b) Get identifying information regarding the customized database version (105), which causes (106) the database information screen (FIG. 12) to be displayed. This identifies the database (904) containing the source data compiled from all participating companies based on an identification number (320 in FIG. 12) and the customized version of the database (321 in FIG. 12) created for the particular participating company;
(c) Access an informational help window (107);
(d) Recall previously-stored query settings (110), which causes a screen (FIG. 13) to be displayed that allows the user to select from a list (325 in FIG. 13) that identifies each stored query by date, report reference code and description. Query settings are stored in a table (905) contained in a separate database supplied when the process was loaded. The fact that this database is separate allows the user to save query settings and recall them even when the other database tables have been updated over time. The user can search the list by clicking a button (326 in FIG. 13) based on date, report reference code or text string. Selecting the desired query by clicking a button (327 in FIG. 13) immediately populates all query settings and returns the user to the main screen from where the user has the option to modify settings or execute the query using the current customized database. If no changes are made to any query settings before the query is executed, output will be stamped with the same report reference code;
(e) Set criteria (120) regarding industry-standard data (901) from the database to be used in the query, which causes a screen (FIG. 14) to be displayed that allows the user to constrain the queried data to records that contain specified values. The steps associated with execution of this option are drawn in FIG. 2 and are described in more detail below;
(f) Set criteria (130) regarding company-specific data (901) from the database to be used in the query, which causes a screen (FIG. 17) to be displayed that allows the user to constrain the queried data to records that contain specified values regarding company-specific parameters (902). The steps associated with execution of this option are drawn in FIG. 3 and are described in more detail below; or
(g) Set query design (140), which causes a screen (FIG. 18) to be displayed that allows the user to define the way that data (901) will be grouped into cells for the purposes of calculating and reporting results. It is from this screen that the user can either return to the main screen for more options or execute the query. The steps associated with execution of this option are drawn in FIG. 4 and are described in more detail below.

The user is always returned to the main screen (FIG. 11) with output options disabled unless the user executes a query (151) or unless query settings from the previous query are unchanged (161). If the user chooses to execute a query (151) and if at least a detail-level query parameter is specified (152), then the query calculation process begins.

Now referring to FIG. 1B, if settings from the previous query are unchanged (153), then the query calculation process is bypassed and the user is returned to the main screen (162). Otherwise, the calculation process is as follows:
(a) Select records (154) from the database (901) that meet the criteria with regard to industry-standard parameters;
(b) With regard to records selected in (a) from the customized database (901), select records (155) that meet criteria regarding company-specific parameters (902). For market-comparable records, the criteria setting regarding a company-specific parameter is ignored if no value has been coded in that parameter. This allows the user to compare statistics for proprietary subsets of the company's business to market-comparable statistics for business that, otherwise, meets all the same criteria. If market-comparable data contains values for a company-specific parameter (for example, if the third-party administrator has mapped zip code to sales region definitions specified by the company), then the criteria is applied for that parameter. This allows the user to compare statistics for the company's business to market-comparable statistics based on proprietary subset definitions (e.g., sales region).

Figure 28:
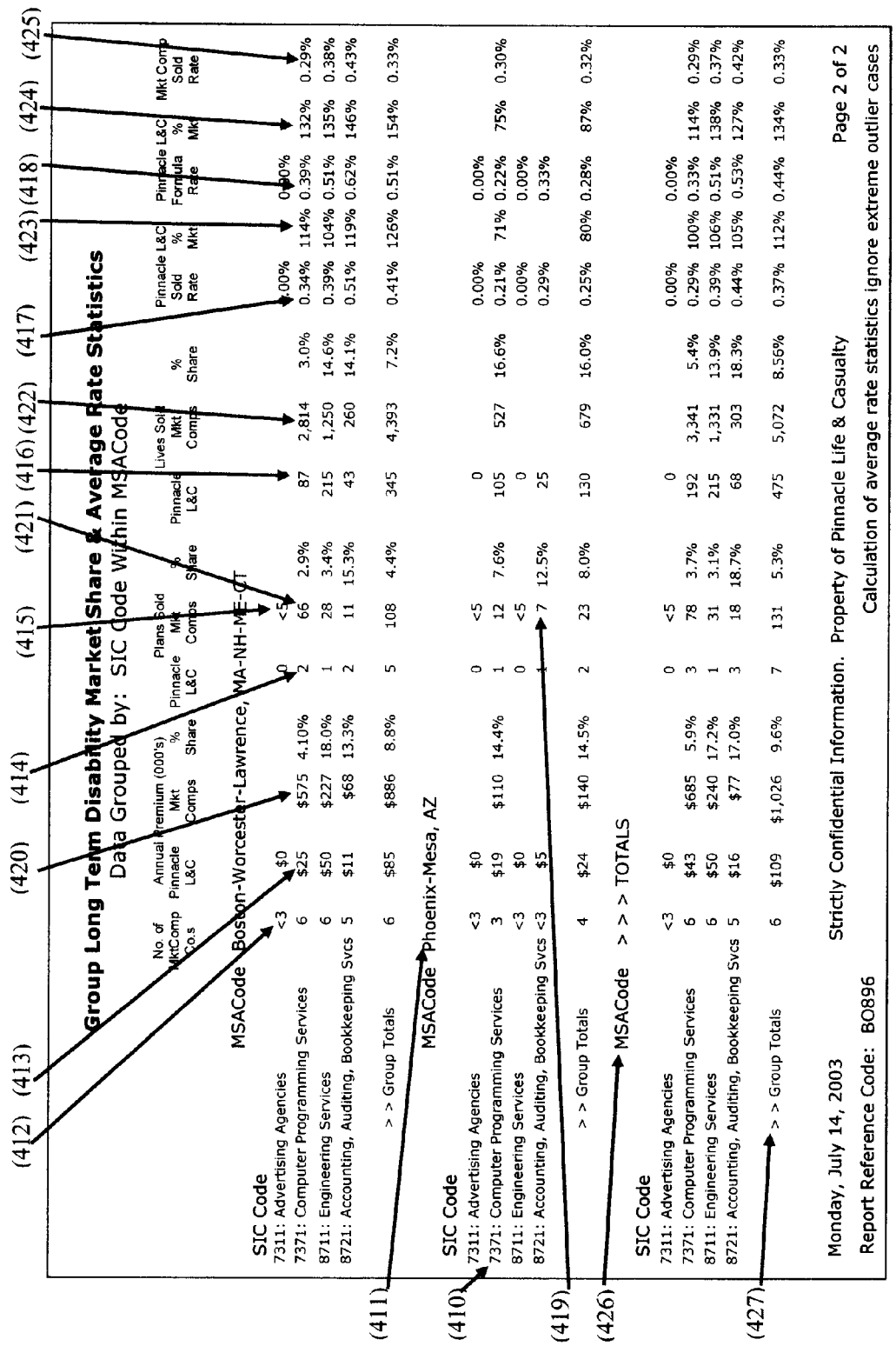
FIG. 28 is an example of a report format that displays market share calculations, displayed in response to the user initiating the option, from the screen of FIG. 22, to view output in "Share and Rate Level" Format.

(c) Group the records into cells (156) defined by every combination of values in the parameters being queried, including subtotals by group level and by detail level and including grand totals. Calculate, for each cell, statistics such as average premium rate, an index of dispersion around the average rate, record count, total premium, total lives, total insured volume, etc. This is done separately for records related to the company's business and for market-comparable business (e.g., the aggregate of all other survey data records in the customized database);

(d) Regarding market-comparable statistics in each cell, apply rules (157) to determine what statistics can be displayed. These rules protect the anonymity of contributors' data by preventing a company from viewing market-comparable information in a cell with so few records that specific case(s) or contributors could be identified. The rules are established by the third-party administrator and can be modified by the third-party administrator from time to time. For example, under current rules, no statistics are displayed if there are less than five market-comparable records in a cell. If there are five or more market-comparable records but fewer than three market-comparable contributors in a cell, only the record count can be displayed. If there are fewer than three market-comparable contributors and fewer than five records in a market-comparable cell and the company has no records that meet the same cell description, then the query ignores the cell completely. FIG. 28 provides examples, discussed in detail below, of how these rules suppress the display of market-comparable statistics for cells with too few records;

(e) Create tables (158) which are the source for all output reports and charts until a new query is run, and establish a unique query reference code which identifies the collection of all output reports and charts generated by the query. All output options can be generated without re-executing the query calculation process.

Figure 19:
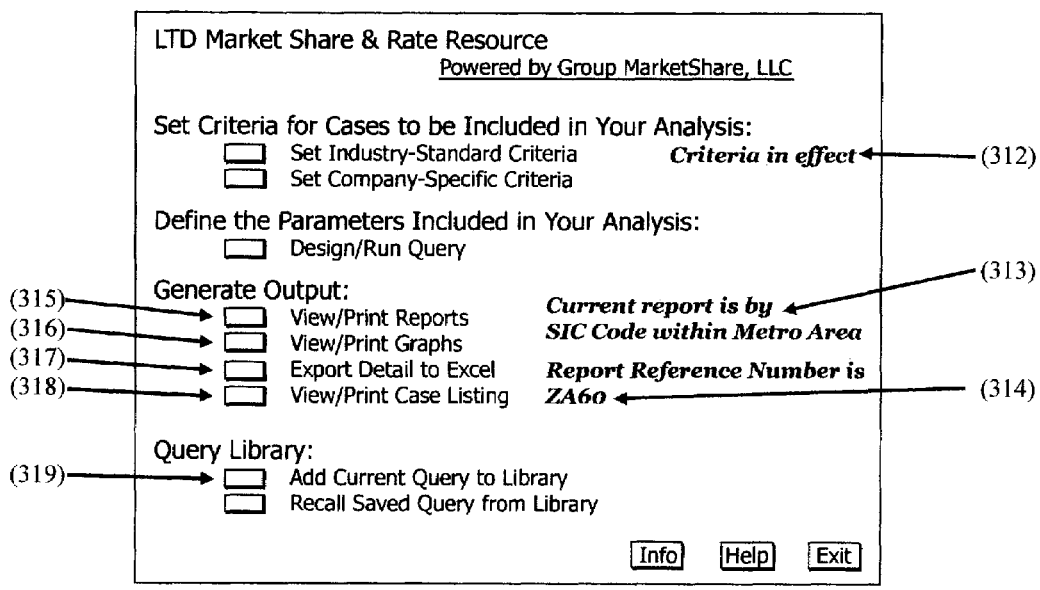
FIG. 19 is the main user-interface screen, referred to in FIG. 1B, after the query has been executed by the user and the screen has been updated to activate options to generate output and save query design.

During this process, a screen displays information (159) regarding the volume of cases being queried. When the query calculation process is complete, the user is returned to the main screen (162). Output options are now enabled (FIG. 19). Also, the main screen has been re-drawn to remind the user that criteria are in effect (312 in FIG. 19), describe the current query design (313 in FIG. 19), and display a unique report reference number (314 in FIG. 19) that will be displayed on all reports and charts generated from the current query.

Once output options are enabled, the user can choose from various output options:

(a) View and/or print results of the query in tabular report formats (170), which causes the report options screen (FIG. 22) to be displayed.

(b) View and/or print results of the query in chart formats (180), which causes the chart options screen (FIG. 20) to be displayed.

(c) Export results (165) to a spreadsheet (906) stored in a location specified by the user by clicking on a button (317 in FIG. 19).

(d) View and/or print detailed information (166) identifying the company's records that contributed to the one or more or all of the output cells by clicking on a button (318 in FIG. 19).

Figure 23:
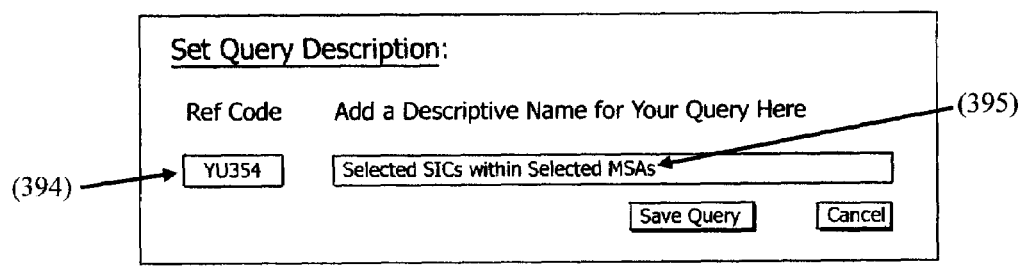
FIG. 23 is an example of the user-interface screen, referred to in FIG. 1B, displayed in response to the user initiating the option, from the screen of FIG. 19, to name and save the query settings for later use.

(e) Save the query settings (167) by clicking on a button (319 in FIG. 19), which causes a screen (FIG. 23) to be displayed enabling the user to describe and store the settings for later use. The user enters a text description (395 in FIG. 23) of the query, which is saved along with the report reference number (394 in FIG. 23) generated by the query. This allows the user to recall query settings from a saved query table (905) based on its description or by referring to the report reference number printed on a chart or report previously generated by that query.

The user also has all the options originally available (168) to view or modify criteria settings and query design parameters, recall a stored query, or exit.

Figure 15:
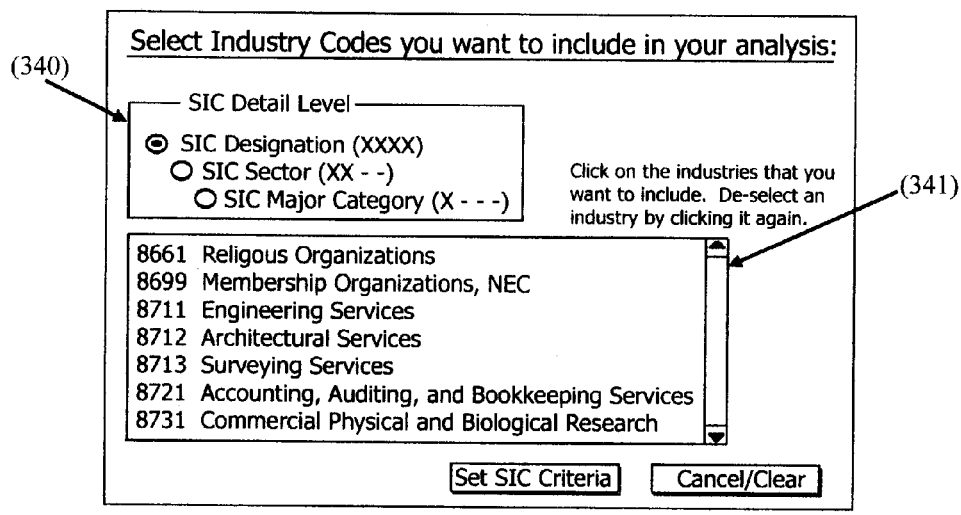
FIG. 15 is an example of the user-interface screen, referred to in FIG. 2, displayed in response to the user initiating the option, from the screen of FIG. 14, to set or view criteria regarding a certain industry-standard feature for records included in a subsequent query.

FIG. 2 describes in greater detail the process (120) of viewing or setting selection criteria regarding industry-standard parameters for records to be included in a query. If this option is selected, a screen (FIG. 14) is displayed (121) that presents the user with a list of all the industry-standard parameters for which criteria can be set. The names of these industry-standard parameters come from the table of industry-standard parameter names in the database (908). The user sets criteria for a parameter by clicking on the button (124 as illustrated by 333 in FIG. 14) associated with that particular parameter. The user is then presented with a form (125) appropriate for that parameter. The user can set criteria (126) from lists of valid options or within valid ranges based on values contained in the database (901). For example, referring to FIG. 14:

(a) For dates, the user specifies a date range (330*a* and 330*b* in FIG. 14) that is valid as long as it falls within the date range for which the company provided data. This rule ensures that the user can only query data for a time period for which the company provided data;

(b) For parameters with numeric values on a continuous scale (e.g. number of lives covered by a policy), the user specifies a range (331*a* and 331*b* in FIG. 14);

(c) For parameters with discrete numeric values, the user selects the range boundaries from a list of valid options (332*a* and 332*b* in FIG. 14);

(d) A parameter with default settings, e.g., product type or policy status, can be modified by clicking on the button associated with that parameter (as illustrated by 333 or 334, respectively, in FIG. 14);

(e) For parameters with alpha-numeric values, a pop-up screen with characteristics similar to FIG. 15 but with modifications appropriate for the particular parameter is displayed. The user may be given options (340 in FIG. 15) regarding how the list of valid options is displayed. The user clicks on value(s) from the list (341 in FIG. 15) of valid options to select them. The user clicks previously selected values to de-select them.

The user can not view options or set criteria regarding a parameter for which the company does not supply data. This rule prevents a company from studying a subset of the survey data if the company does not contribute to ability of all participants to study that subset of the survey data. The process of selecting values from lists of valid options is fast, easy, and accurate and ensures that criteria match at least some records in the customized database.

Figure 16:
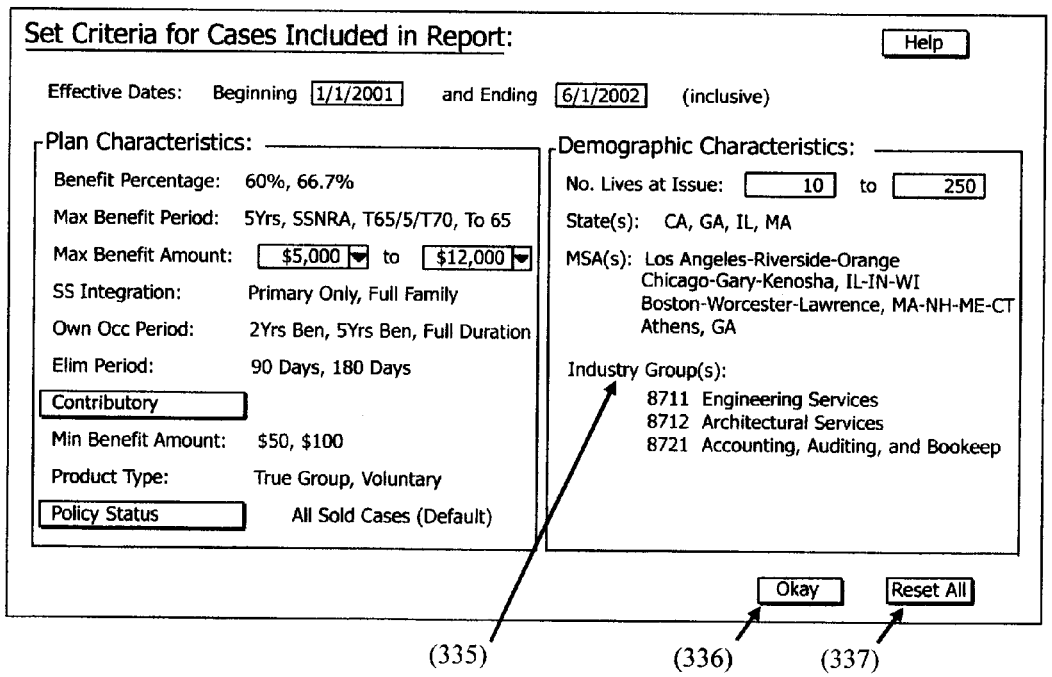
FIG. 16 is an example of the user-interface screen, referred to in FIG. 2, after it has been updated in response to multiple selections made by the user.

Referring again to FIG. 2, each time the user sets the criteria for any particular parameter the industry-standard selection criteria screen is re-drawn (128) to display the criteria set. FIG. 16 shows an example of this re-drawn screen after criteria have been set for multiple parameters. From this screen, the user can select a new parameter for which to set criteria and also easily view all criteria previously set. That is, the system is configured to display on the display of a computing device one or more screen representations of information selection options or parameter choices and, for at least one of those options and preferably adjacent to such selection option, a representation of an information selection (parameter choice) previously made. The user can modify any criteria previously set (124) by clicking on the parameter name (as illustrated by 335 in FIG. 16), which causes the appropriate set-criteria screen (similar to FIG. 15) to be displayed. The user can then select new values (126) or click previously selected values to de-select them (127). The user can clear (122) all industry-standard criteria settings by clicking on one button (337 in FIG. 16). The user has the option to exit this screen (123) by clicking the "okay" button (336 in FIG. 16) at any time.

FIG. 3 describes in greater detail the process (130) of viewing or setting selection criteria regarding company-specific parameters for records to be included in a query. If this option is selected, a screen (FIG. 17) is displayed (131) that presents the user with company-specific parameters for which criteria can be set, each associated with a button. The names of these company-specific parameters (illustrated by 350 in FIG. 17) depend on parameters, if any and at the company's option, which the company named and are stored in the customized database (902) and for which the company supplied data in the database. If the user clicks on a button associated with a particular parameter (134), the screen is updated (135) to display the list of valid options (351 in FIG. 17) for that parameter. The user clicks on value(s) from the list of valid options to select them (136). These lists of valid options are based on values contained in the database (901). The user clicks previously selected values to de-select them (137). The user can click on previously selected parameter name to clear and close the list of selected values associated with that parameter. The user can clear (132) all company-specific criteria settings by clicking one button (353 in FIG. 17). The user has the option to exit this screen (133) by clicking the okay button (352 in FIG. 17) at any time.

FIG. 4 describes in greater detail the process of designing a query. The user designs a two-dimensional query by specifying a detail-level parameter, values of which will define the rows of the query output. Columns of the query output will be the various types of statistics calculated for each row. Optionally, the user can design a three-dimensional query by specifying a group-level parameter. Two-dimensional queries are run for each value in the group-level parameter, creating a series of two-dimensional queries. At least a detail-level parameter must be specified before a query can be executed.

When the option to design a query (140) is selected, a screen (FIG. 18) is displayed (141). The user has the following options:
 (a) Specify (195) whether or not records with extreme rate levels, meaning unusually high or low rate levels falling outside bounds determined by the third-party administrator, should be included in the calculation of market-comparable average rate statistics (365 in FIG. 18);
 (b) Exit this screen (142) at any time without executing a query by clicking the close button (364 in FIG. 18).
 (c) Select a detail-level parameter (143) from a list of valid parameters (360 in FIG. 18) by clicking on the desired value. The list of valid parameters comes from the tables of parameter names in the database (908 and 902) for which the company supplied data. The user can not select parameters for which the company does not supply data. This rule prevents a company from studying the survey data grouped by a certain parameter if the company does not contribute to ability of all participants to study the survey data by that same parameter. The process of selecting values from lists of valid options is fast, easy, and accurate and ensures that criteria match at least some records in the customized database.
 (d) Choose to specify a group-level parameter (144), in which case the screen is re-drawn (145) to display a list of valid parameters (362 in FIG. 18). The user then selects a group-level parameter (146) by clicking on the desired parameter. An existing group-level parameter can be removed by clicking on a button (361 in FIG. 18), in which case the screen is re-drawn (196) to hide the group-level pull-down list;
 (e) Execute a query (150) by clicking the run query button (363 in FIG. 18).

Values in certain parameters (e.g., dates; lives-at-issue) must be grouped into a reasonable number of report categories (e.g., monthly; 10–24 lives). If either the group-level or detail-level parameter is one of these certain parameters (147), then the screen is re-drawn (148) and the user must, depending on the parameter, select an option or define ranges (149). Re-drawing the screen to display only interface options that require user choices keeps the screen easy to view and navigate, especially for the non-technical user.

Figure 5:
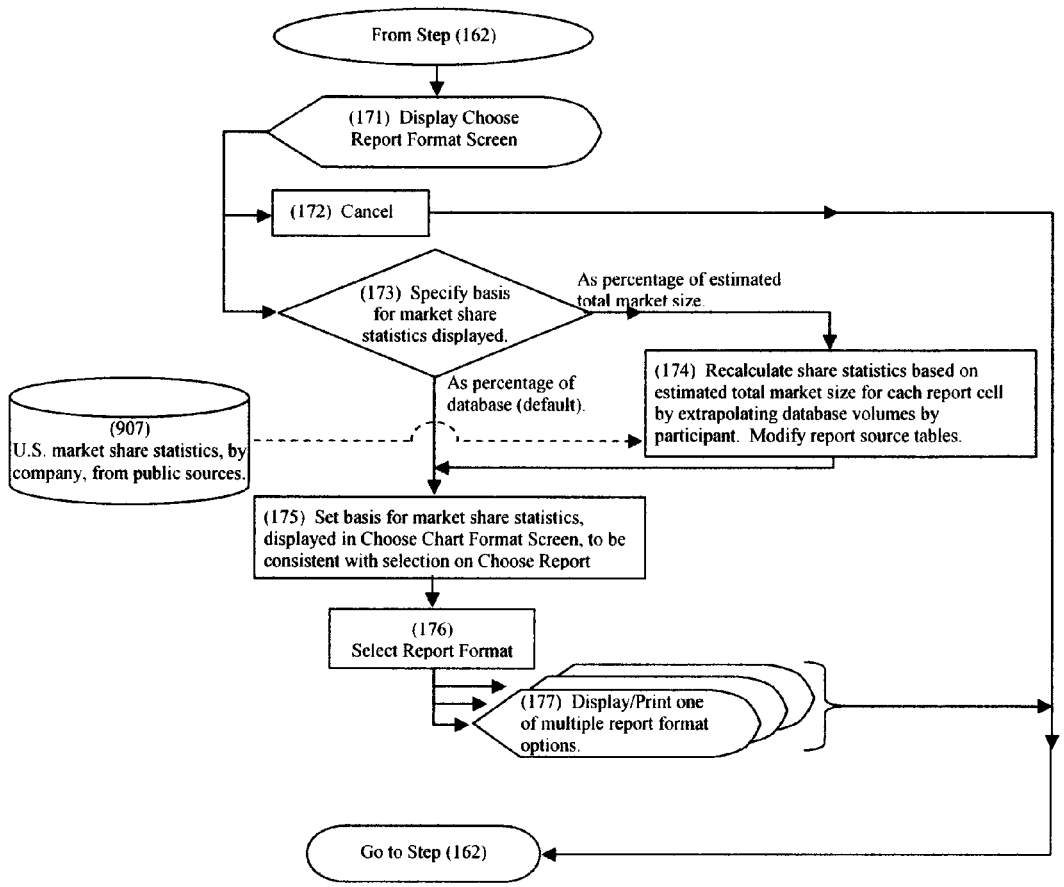
FIG. 5 is a flowchart diagram of the process, referred to in FIG. 1B, by which the user selects a tabular report output format from a number of options offered by the invention.
Figure 22:
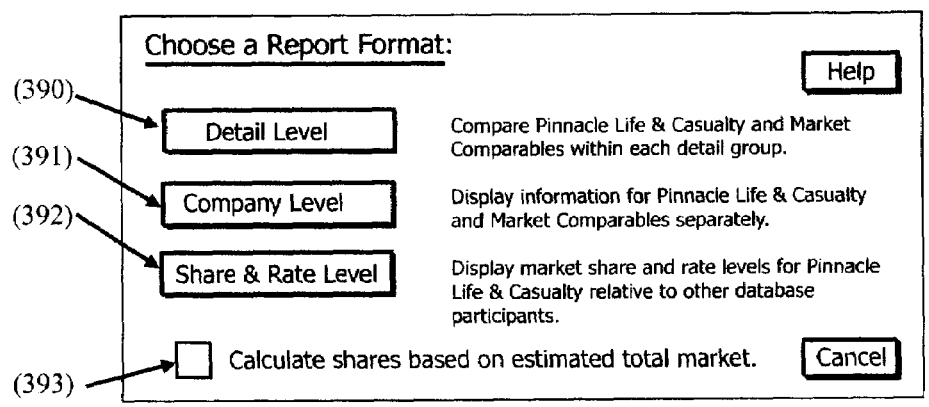
FIG. 22 is the user-interface screen, referred to in FIG. 5, displayed in response to the user initiating the option, from the screen of FIG. 19, to select and view output one of various report formats.
Figure 27:
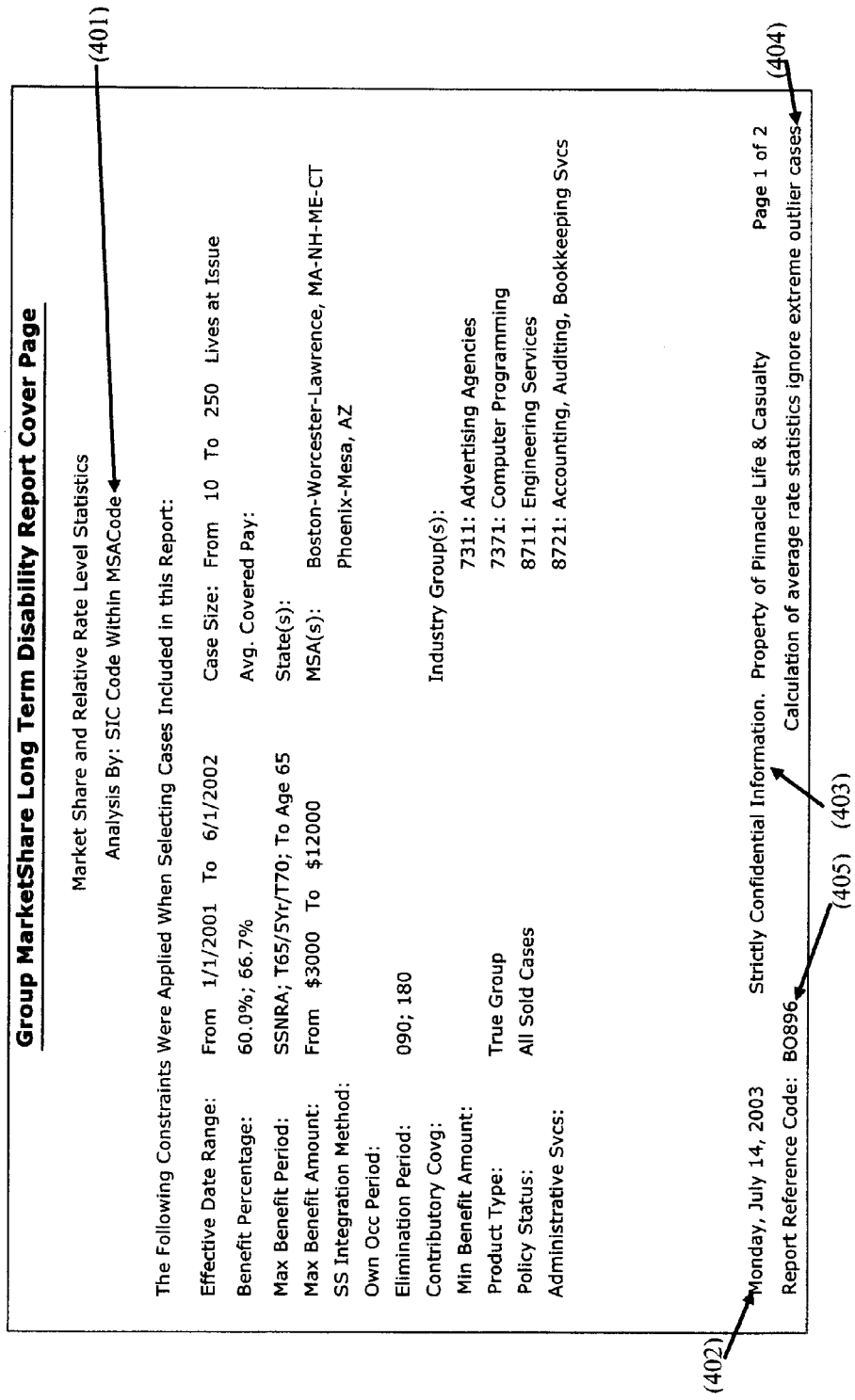
FIG. 27 is an example of the cover page to a report, displayed in response to the user initiating the option, from the screen of FIG. 22, to view output in one of various report formats.

FIG. 5 describes in greater detail the process (170) by which the user selects a report format to view and, optionally, to print once a query calculation process has been completed. The user selects the option to view/print reports (315 in FIG. 19) from the main screen (FIG. 19) now that output options are enabled. A screen is displayed (171) that presents the user with options for available report formats (FIG. 22). The user has the options to:
 (a) Cancel (172) and return to the main screen (FIG. 19);
 (b) Select (or de-select) the option (173) to calculate the company's share statistics as percentage of total market volumes (907) estimated for each cell. This is done by clicking on the check-box (393 in FIG. 22), in which case source tables for charts and reports are all updated (174). The similar option (379 in FIG. 20) in the "Choose Chart Format" screen (FIG. 20) is updated (175) to be consistent;
 (c) Select (176) one of several report formats, which causes the selected report to be displayed (177) on the computer screen with the option to print. Each report format has a front page similar to FIG. 27 that describes the query design (401 in FIG. 27) and documents criteria in effect.

Every page of every report format includes the current date (402 in FIG. 27), a confidentiality statement (403 in FIG. 27), information regarding the basis for certain calculations (404 in FIG. 27), and the report reference code (405 in FIG. 27) generated by the query. Report formats are described in greater detail below.

After a report is viewed and/or printed, the user is returned to the main screen (162) as illustrated by FIG. 19, from which the user can select more output options or view or modify query settings.

Figure 6:
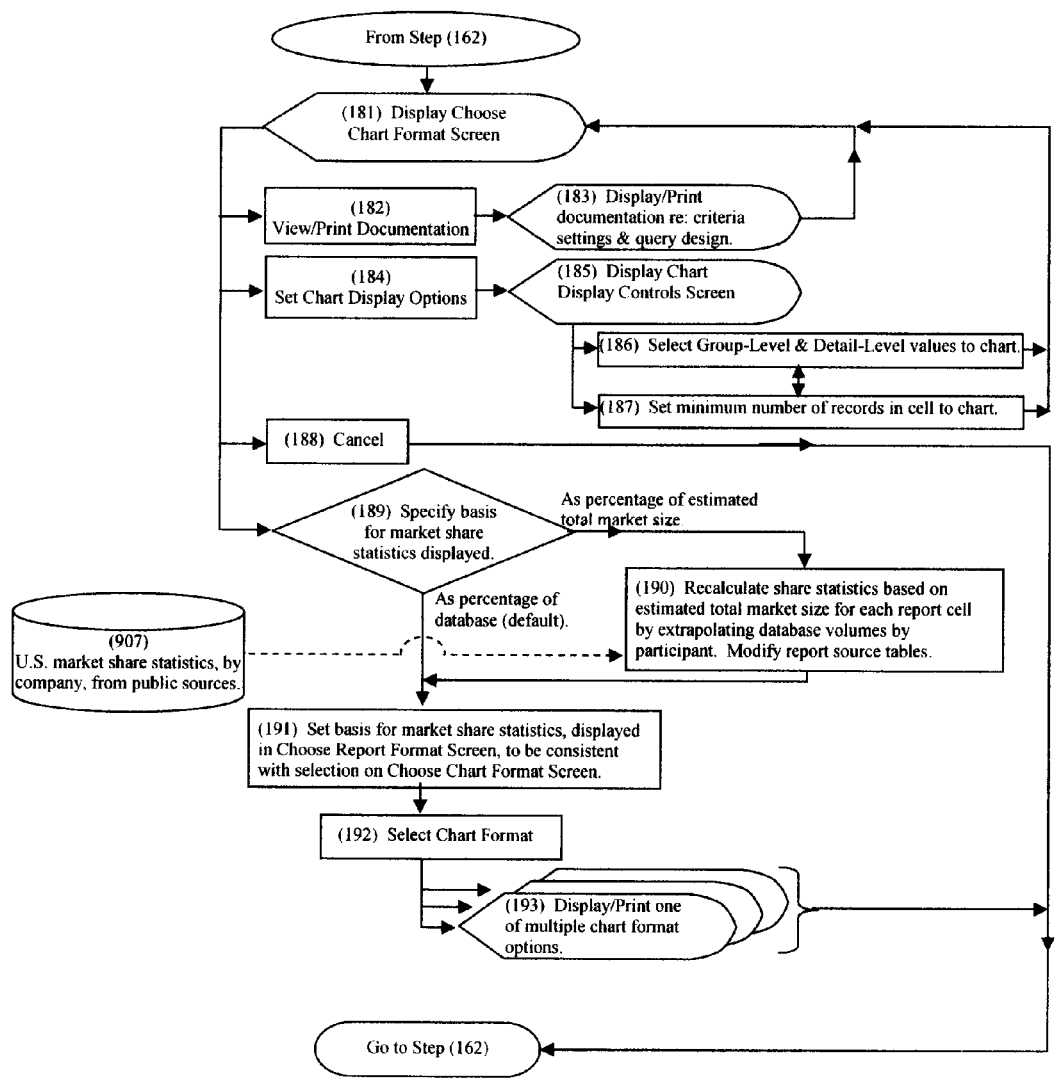
FIG. 6 is a flowchart diagram of the process, referred to in FIG. 1B, by which the user selects a graphic chart output format from a number of options offered by the invention.
Figure 20:
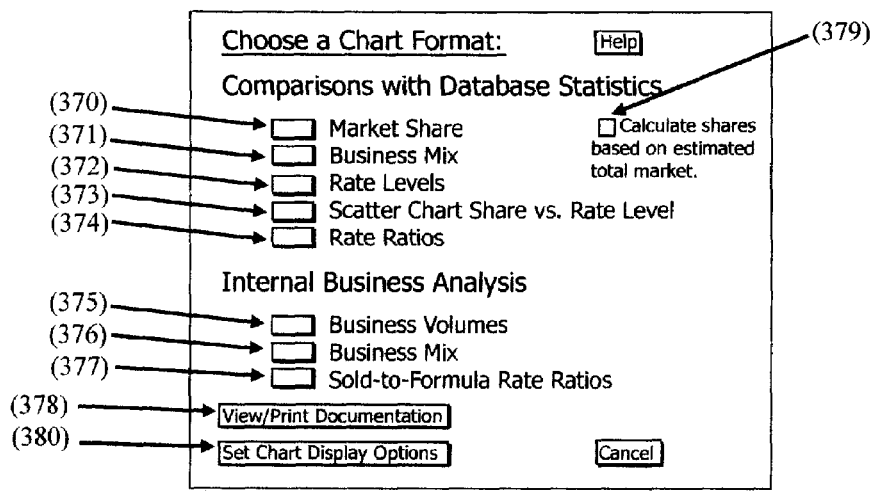
FIG. 20 is the user-interface screen, referred to in FIG. 6, displayed in response to the user initiating the option, from the screen of FIG. 19, to select and view output one of various chart formats.
Figure 21:
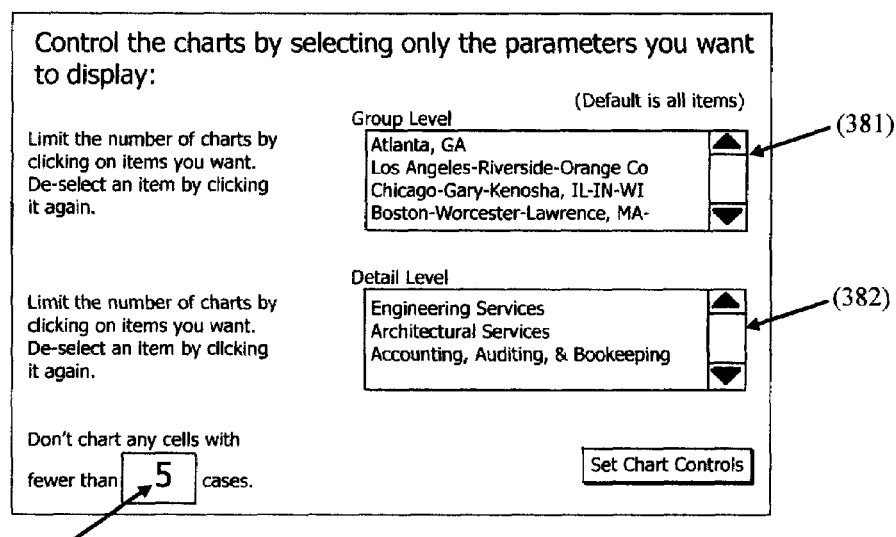
FIG. 21 is the user-interface screen, referred to in FIG. 6, displayed in response to the user selecting the option to control which output generated by the query is to be included in chart output subsequently generated.
Figure 33:
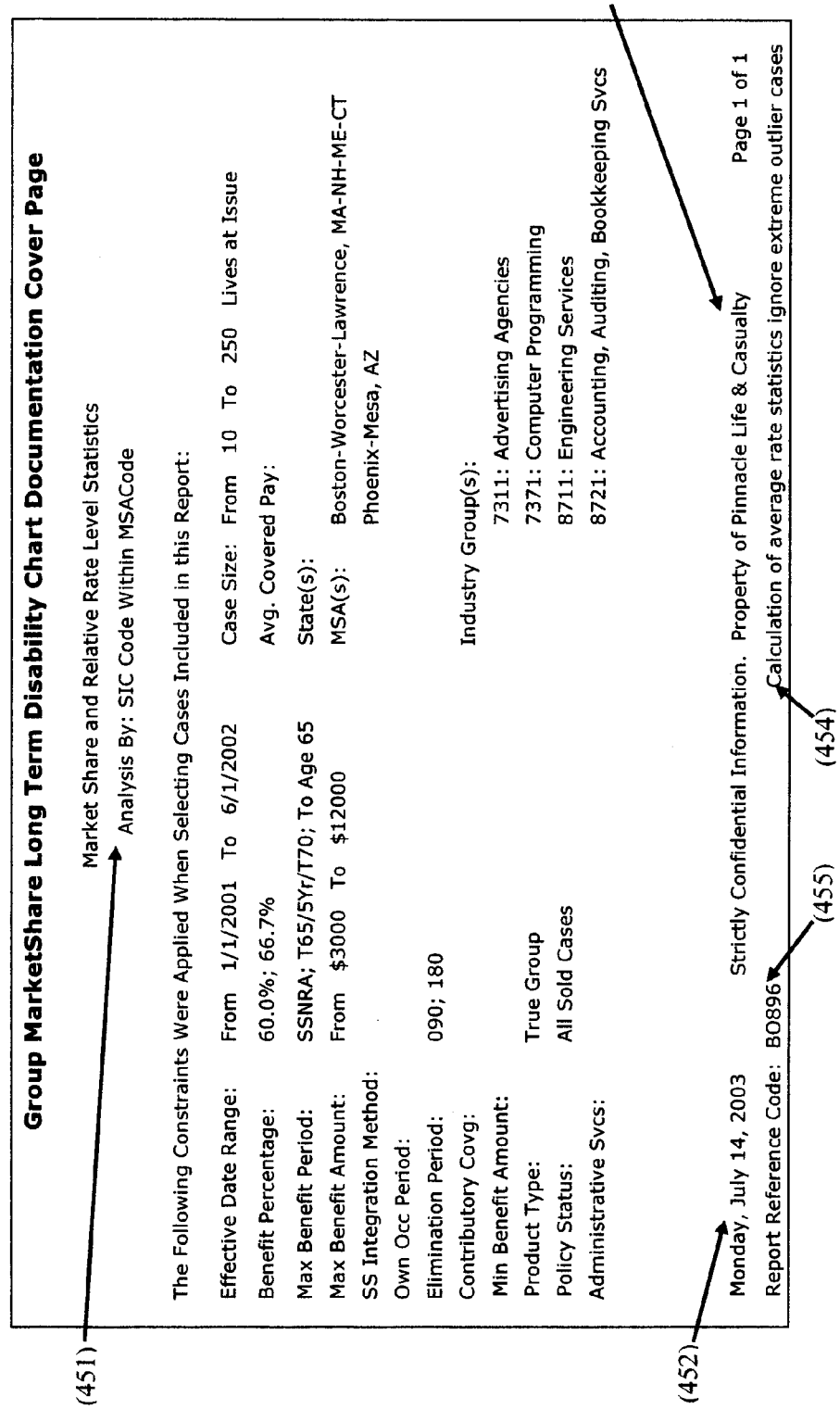
FIG. 33 is an example of the cover page to a chart, displayed in response to the user initiating the option, from the screen of FIG. 20, to view or print a documentation cover page.

FIG. 6 describes in greater detail the process (180) by which the user selects a chart format to view and, optionally, to print once a query calculation process has been completed. The user selects the option to view/print graphs (316 in FIG. 19) from the main screen now that output options are enabled (FIG. 19). A screen is displayed (181) that presents the user with options for available chart formats (FIG. 20). The user has the options to:

(a) Cancel (188) and return to the main screen (FIG. 19);
(b) View and/or print a documentation page (182) by clicking on a button (378 in FIG. 20), which causes a documentation cover page similar to FIG. 33 to be displayed (183) on the computer screen with the option to print. This page describes the query design (451 in FIG. 33) and documents criteria in effect. It includes the current date (452 in FIG. 33), a confidentiality statement (453 in FIG. 33), information regarding the basis for certain calculations (454 in FIG. 33), and the report reference code (455 in FIG. 33) generated by the query.
(c) Select (or de-select) the option (189) to calculate the company's share statistics as percentage of total market volumes (907) estimated for each cell. This is done by checking the check-box (379 in FIG. 20), in which case source tables for charts and reports are all updated (190). The similar option (393 in FIG. 22) in the "Choose Report Format" screen (FIG. 22) is updated (191) to be consistent;
(d) Set chart display options (184) by clicking on a button (380 in FIG. 20), which causes a screen (FIG. 21) to be displayed (185). Using this screen, the user can select (186) group-level parameters (from a list illustrated as 381 in FIG. 21) and detail-level parameters (from a list illustrated as 382 in FIG. 21) that the user wants included in any charts. This allows the user to view multiple charts, each with many data cells, and then focus in on charts and data points of interest. The user has the option (187) to suppress the charting of data for cells with record counts below a threshold (383 in FIG. 21) set by the user.
(e) Select (192) one of numerous chart formats, which causes the selected chart to be displayed (193) on the computer screen with the option to print.

After a chart is viewed and/or printed, the user is returned to the main screen (step 162 in FIG. 1B, and illustrated as FIG. 19), from which the user can select more output options or view or modify query settings. Characteristics of chart formats are described in greater detail below.

Figure 7:
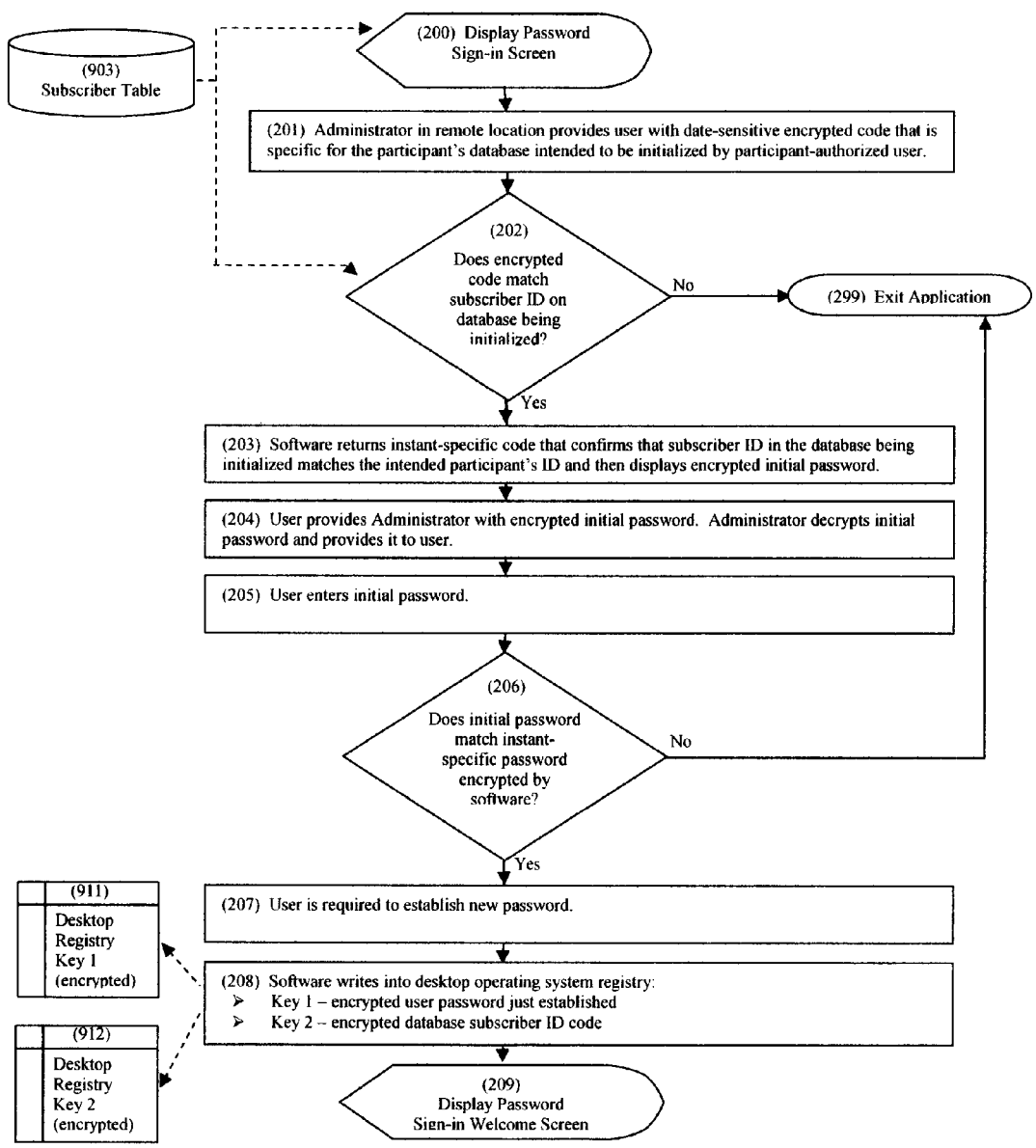
FIG. 7 is a flowchart diagram describing the process employed by a third-party administrator to activate the invention on a client computer.
Figure 24:
FIG. 24 is an informative screen displayed while the invention establishes links to the database stored on a user's computer and before the user is presented with any interface options.
Figure 25:
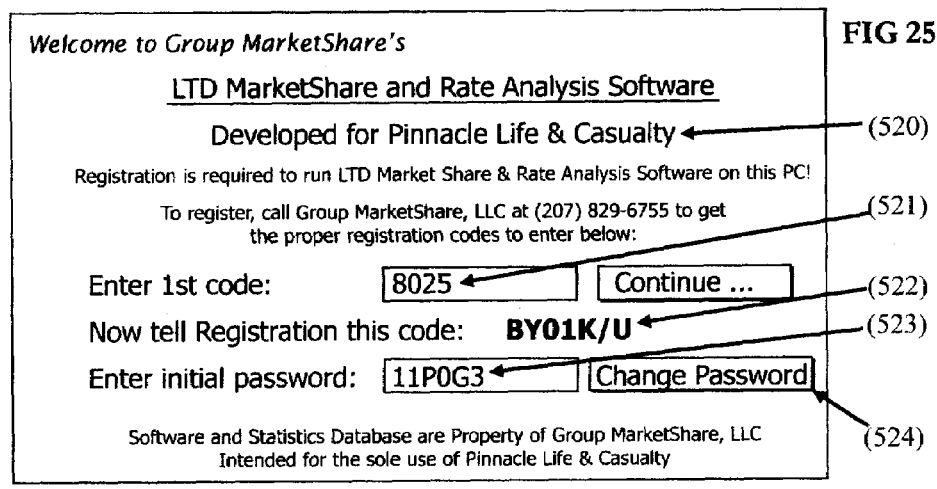
FIG. 25 is an example of the user-interface screen that allows the user to activate the software on his/her computer using codes supplied by the third-party administrator.
Figure 26:
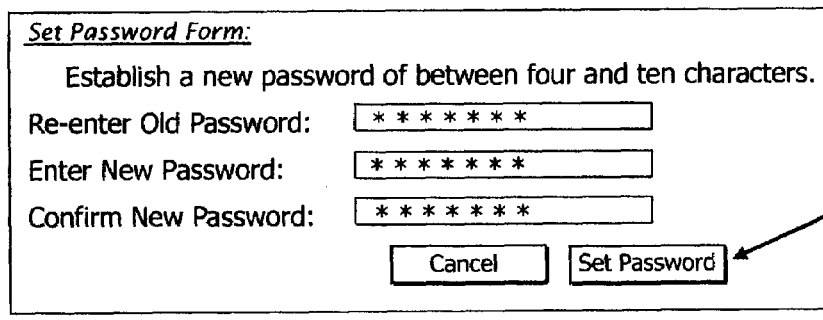
FIG. 26 is the user-interface screen that allows the user to change their password, as referred to in FIG. 7.

FIG. 7 describes in greater detail the process of activating the process once it is installed on a computer. When the user initiates the process, the process briefly displays an informational screen (FIG. 24) while it searches for the location of the databases that contain the various tables that the process will access. The process establishes necessary links to those tables. The activation sign-in screen (FIG. 25) is displayed (200). The third-party administrator provides the user with a date-sensitive code that is specific for the company that has authorized activation of the process for a user (201). The user enters this code (illustrated as 521 in FIG. 25). The process tests (202) that the database being accessed by the process has been customized (based on data in the subscriber table 903) for the same company (520 in FIG. 25), which has authorized activation of the process for the user. That is, the process tests that the user is authorized to access the customized database it is linked to. Failure of this test exits the application immediately (299). If the test passes, then the process causes a code to be displayed (203). This code (522 in FIG. 25) is an instant-sensitive encrypted initial password which is then relayed to the third-party administrator (204) who decrypts the code and tells the user the initial password to enter. The user enters this initial password (205, illustrated as 523 in FIG. 25) and then clicks the "change password" button (524 in FIG. 25) to proceed. If the password is valid, the process displays a screen (FIG. 26) so the user can establish a password for future use (207). The user clicks the "set password" button (525 in FIG. 26) to proceed. The process then (208) encrypts and writes the user password into the computer's operating system registry, and also encrypts and writes the company identifier code into the computer's operating system registry. The user is returned to the sign-in screen (209), illustrated in FIG. 10.

Figure 8:
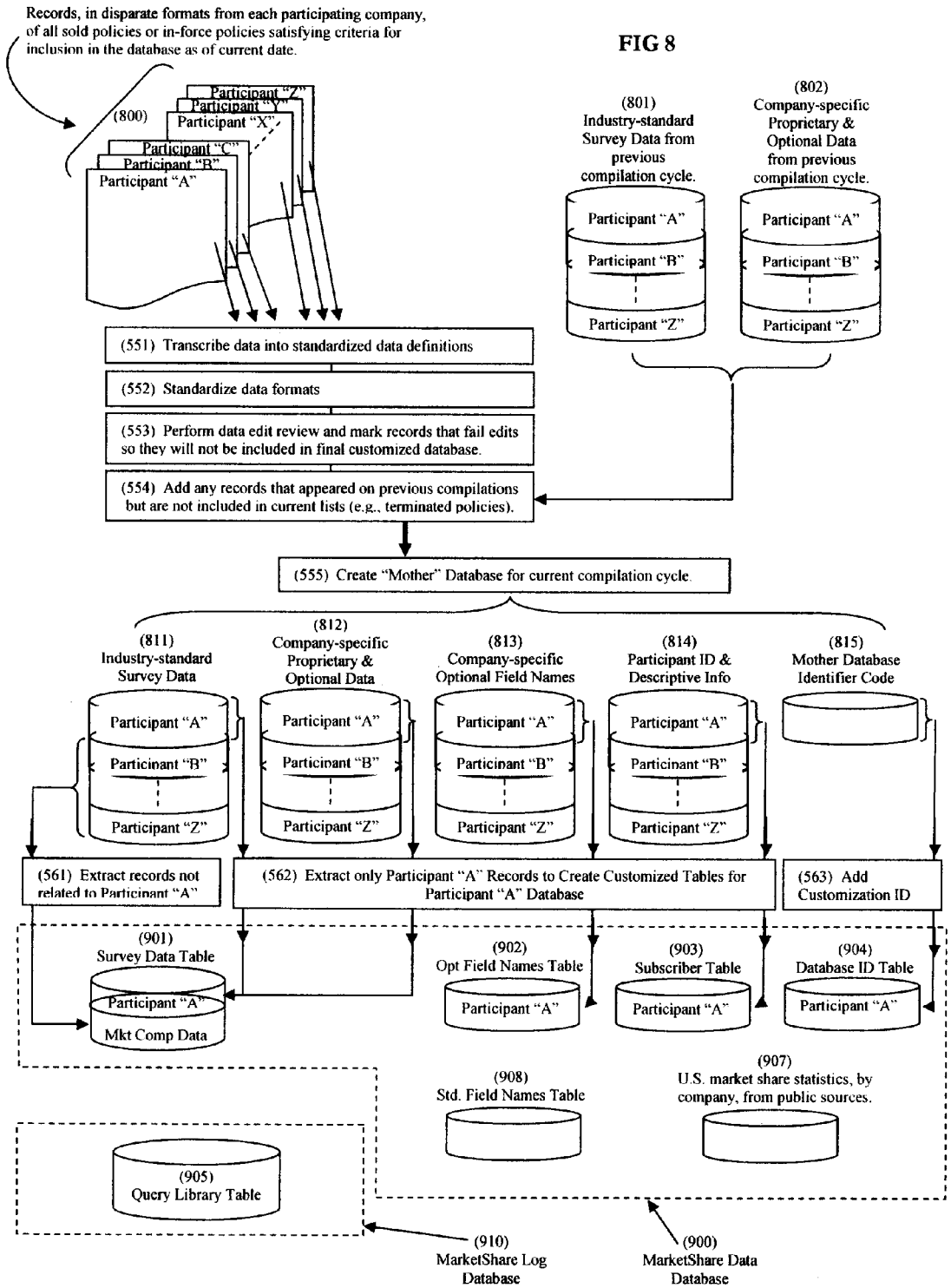
FIG. 8 is a flowchart diagram describing the process employed by a third-party administrator to compile data, collected from all participating companies, and then to create a database for each participating company which is then accessed by the software.

FIG. 8 describes in greater detail the process by which data in disparate formats (800) is collected from the various participating companies and then compiled into a customized database for each participating company. Data is organized into one record for each survey unit (e.g., policy) and tagged with a unique identifier (e.g., policy number combined with participant code). The third-party administrator transcribes codes and data values from each company into a finite number of data definitions (551) and standardized formats (552) established by the third-party administrator. The third-party administrator performs edit checks (553) on the data to ensure that certain required data exists on each record and that data values fall within reasonableness bounds. Records not passing the edit checks are discarded. As an additional check for completeness, the third-party administrator searches for and adds (554) records and data included in the previous compilation cycle (801 and 802) but not reported in the current compilation cycle. Once the data is compiled for all participating companies, the third-party administrator creates a database which contains tables of records:

(a) Industry-standard survey data (811), including the unique record identifier and the company identifier for each record;
(b) Company-specific data (812), including the unique record identifier and the company identifier for each record and optional proprietary data, if any;
(c) Company-specific field names (813), if any, with data that includes the company identifier and labels each parameter for which the company supplied company-specific optional data;
(d) Participant ID information (814), including name; and
(e) Database ID information (815).

From this database, the third-party administrator creates a customized database for each participating company using a generalized, automated process. For example, with respect to customization for a particular participating company, the Survey Data table (901) is constructed from:

(a) Industry-standard data extracted (561) for all market-comparable records; plus
(b) Industry-standard data and company-specific data extracted (562) for all records submitted by the company.

Records for the Optional Field Names table (902), which contains only the company's records, are extracted (562) from the source table (813). The Subscriber table (903) is extracted (562) from its source table (814). The Customized Database ID table (904) is created by adding a company-specific customization code (563) to the mother database identifier code. The third-party administrator adds two tables that are the same for all companies: (a) a table naming the industry-standard parameters (908); and (b) a table of public U.S. market statistics, by company (907), for all companies, whether or not they participate in the survey. All of the tables contained within the dashed line (900) are grouped together in a customized database that is secured so that the data can not be viewed and can only be accessed by the process. This customized database can then be sent to the user in various forms or downloaded by the user. The user saves the database where the process can access it. Note that, if one company's customized database were mistakenly sent to another company's authorized user, that user could not access the data because the registry key on their computer (912 in FIG. 1A) would not match the subscriber ID in the customized database (903) and the process would immediately terminate.

The system of the present invention is arranged to enable a contributor to configure an output according to parameters unique to that particular contributor and as defined by that contributor. For example, in the preferred embodiment of the invention, the third-party administrator may alter market-comparable records extracted (561 in FIG. 8) into the Survey Data table (901 in FIG. 8) in one of two ways:

(a) If there exists a one-to-one relationship between values for some industry-standard parameter (e.g., zip code) and values for some company-specific parameter (e.g., sales region), then the third-party administrator may add data regarding the company-specific parameter for market-comparable records. This allows a company to query both company data and market-comparable data based on company-specific values. For example, the company could query their data and market-comparable data based on company-specific definitions of sales region;

(b) If the company for which the database is customized does not provide data regarding some industry-standard parameter, then the third-party administrator deletes all market-comparable data regarding that parameter. The company can not set criteria based on that parameter and can not design queries based on that parameter because there are no values in their database for that parameter. This ensures that a company can only query market-comparable data regarding parameters for which they provide data, thus maintaining the incentive to contribute data in order to get data.

The query library table (905 in FIG. 8) is contained in a separate library database (illustrated by the dashed line 910) that is included when the process and database are initially installed by the user. This table is formatted to accept query settings the user chooses to store over time. Initially, the table can be empty or can contain "canned" queries that a new user can begin using immediately. Users can save query settings and send them to other users. For example, a set of query settings can be created by one person in the company's main office and then saved in or sent to a location where it can be accessed by all sales office managers who are authorized users. These additional users can now recall and use and/or modify the query settings developed for them.

When the user selects the option (176 in FIG. 5) to view and/or print a "Share and Rate Level" report by clicking on the appropriate button (392 in FIG. 22), a report similar to FIG. 28 is displayed on the computer screen and can be printed. Referring to FIG. 28, this report format displays the company's share of total data and compares the company's average rate levels to market-comparable rate levels for each cell generated by the query that the rules allow to be displayed. Share in each cell is based on total database data in that cell or an estimate of total market data for that cell, depending on the option selected earlier by the user. The report is grouped into one block for each group-level value (411). Within each block, there is a row for each detail-level value (410). Statistics displayed for each combination of group-level and detail-level value include:

(a) Number of contributors to market-comparable data within the cell (412);

(b) The annual premium volume related to the company's data (413) and the market-comparable data (420), and the company's percentage share of the total premium volume;

(c) The number of records related to the company's data (414) and the market-comparable data (421), and the company's percentage share of the total number of records;

(d) The number of lives insured related to the company's data (416) and the market-comparable data (422), and the company's percentage share of the total lives insured;

(e) The company's average sold rate (417), the company's average formula rate (418), the market-comparable average sold rate (425), and the ratios of the company's rates to the market-comparable sold rate (423) (424).

The report creates a block for the total of all group-level values (426) and displays statistics for the total of all detail-level values within each block (427).

FIG. 28 provides an example of how the rules operate to suppress display of certain market-comparable statistics. If there are too few market-comparable contributors (412) and too few market-comparable records (415) in a cell, the report displays this information, does not display any market-comparable data, and does not display any comparisons between the company data and the market-comparable data. If there are too few market-comparable contributors but enough market-comparable records (419) in a cell, the report displays the number of records and the company's share of the total number of records. These same rules apply to the display of statistics for cells representing sub-totals and totals.

When the user selects the option (176 in FIG. 5) to view and/or print a "Company Level" report by clicking on the appropriate button (391 in FIG. 22), a report similar to FIG. 29 is displayed on the computer screen and can be printed. Referring to FIG. 29, this report format displays statistics regarding the company's data (430) for each cell generated by the query that the rules allow to be displayed. Statistics displayed include the ratio (431) of premium sold to premium that would have been sold if formula rates had been charged on those same cases, the average sold premium per life insured (432), and the ratio of average sold rate to average formula rate (433). If there is more than one case in the cell, the display includes an index (434) indicating how widely dispersed rates are around the average. FIG. 30 is a continuation of this report showing market-comparable data (435) for the same cells that were displayed for the company in FIG. 29.

When the user selects the option (176 in FIG. 5) to view and/or print a "Detail Level" report by clicking the appropriate button (390 in FIG. 22), a report similar to FIG. 31 is displayed on the computer screen and can be printed. Referring to FIG. 31, this report format displays a line of statistics regarding the company's data (440) and then a line of statistics regarding market-comparable data (441) for each cell generated by the query that the rules allow to be displayed. The same rules described above govern display of market-comparable data in this report. FIG. 32 is a continuation of this report showing the block of statistics related to the total (442) across all group-level values.

Figure 34:
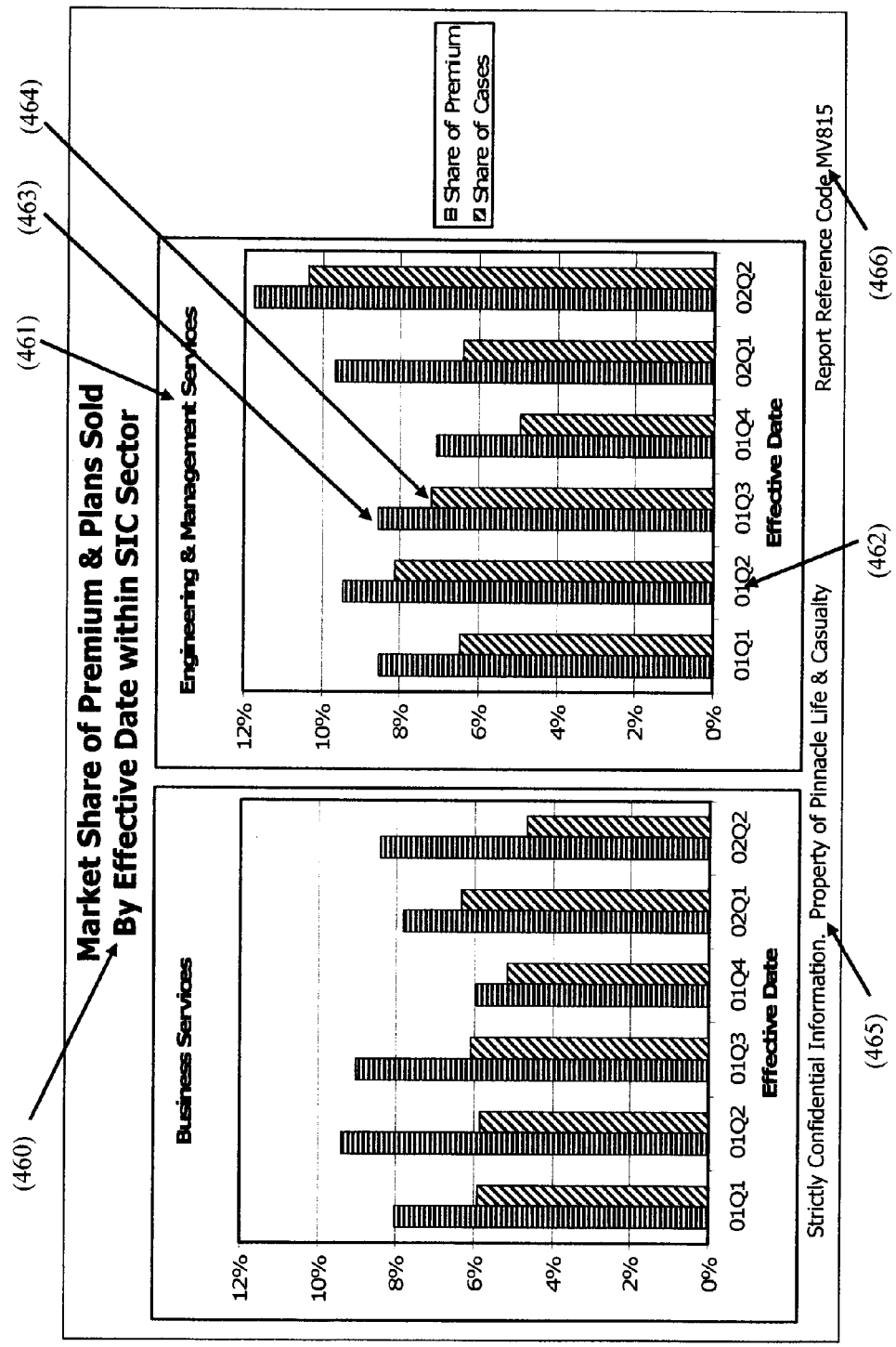
FIG. 34 is an example of a chart format displayed in response to the user initiating the option, from the screen of FIG. 20, to display the company's market share.

When the user selects the option (192 in FIG. 6) to view and/or print a "Market Share" chart by clicking the appropriate button (370 in FIG. 20), a chart similar to FIG. 34 is displayed on the computer screen and can be printed. Referring to FIG. 34, this chart format includes a description of the query design (460). All chart formats include a confidentiality statement (465) and report reference code (466) generated by the query. The chart displays a graph for each group-level value (461), just as reports display a block for each group-level value. The horizontal axis displays each detail-level value (462). The vertical scale is the same for each graph. The chart displays the company's percentage share of annual premium (463) and the company's percentage share of records (464) for each combination of group-level and detail-level value (e.g., cell). Share in each cell is based on total database data in that cell or an estimate of total market data that would fall in that cell, depending on the option selected earlier by the user. If rules suppress display of market-comparable statistics for a cell, then no cluster of bars is created for that cell. This chart compares the company's market share cell-by-cell.

Figure 35:
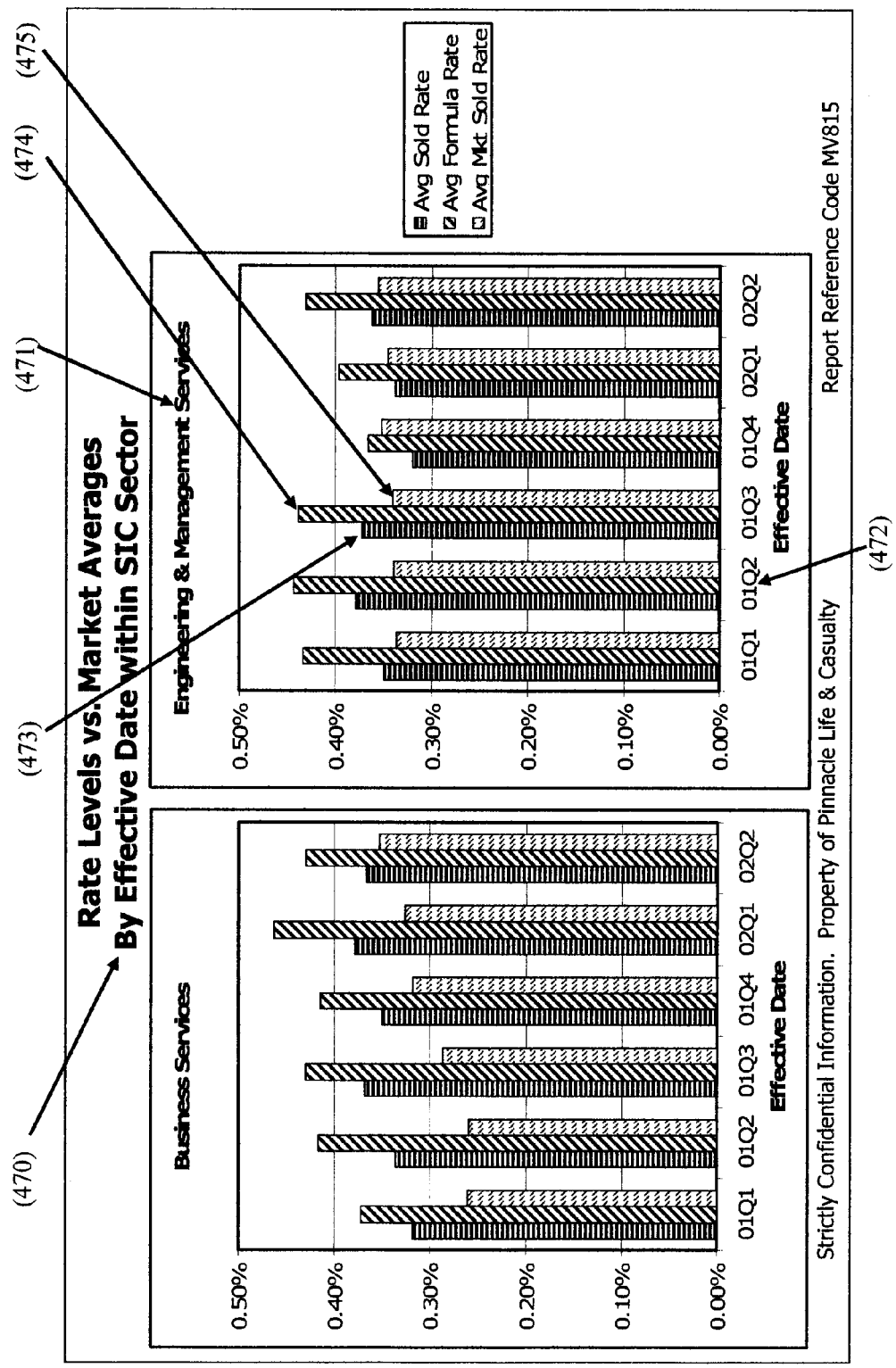
FIG. 35 is an example of a chart format displayed in response to the user initiating the option, from the screen of FIG. 20, to display the company's rate levels and market-comparable rate levels.

When the user selects the option (192 in FIG. 6) to view and/or print a "Rate Levels" chart by clicking the appropriate button (372 in FIG. 20), a chart similar to FIG. 35 is displayed on the computer screen and can be printed. Referring to FIG. 35, this chart format includes a description of the query design (470). The chart displays a graph for each group-level value (471). The horizontal axis displays each detail-level value (472). The vertical scale is the same for each graph. The chart displays the company's average sold rate (473) and the company's average formula rate (474) and the market-comparable average sold rate (475) for each combination of group-level and detail-level value (e.g., cell). If rules suppress display of market-comparable statistics for a cell, then the market-comparable average rate is not graphed for that cell. This chart compares company and market-comparable rate levels cell-by-cell.

Figure 36:
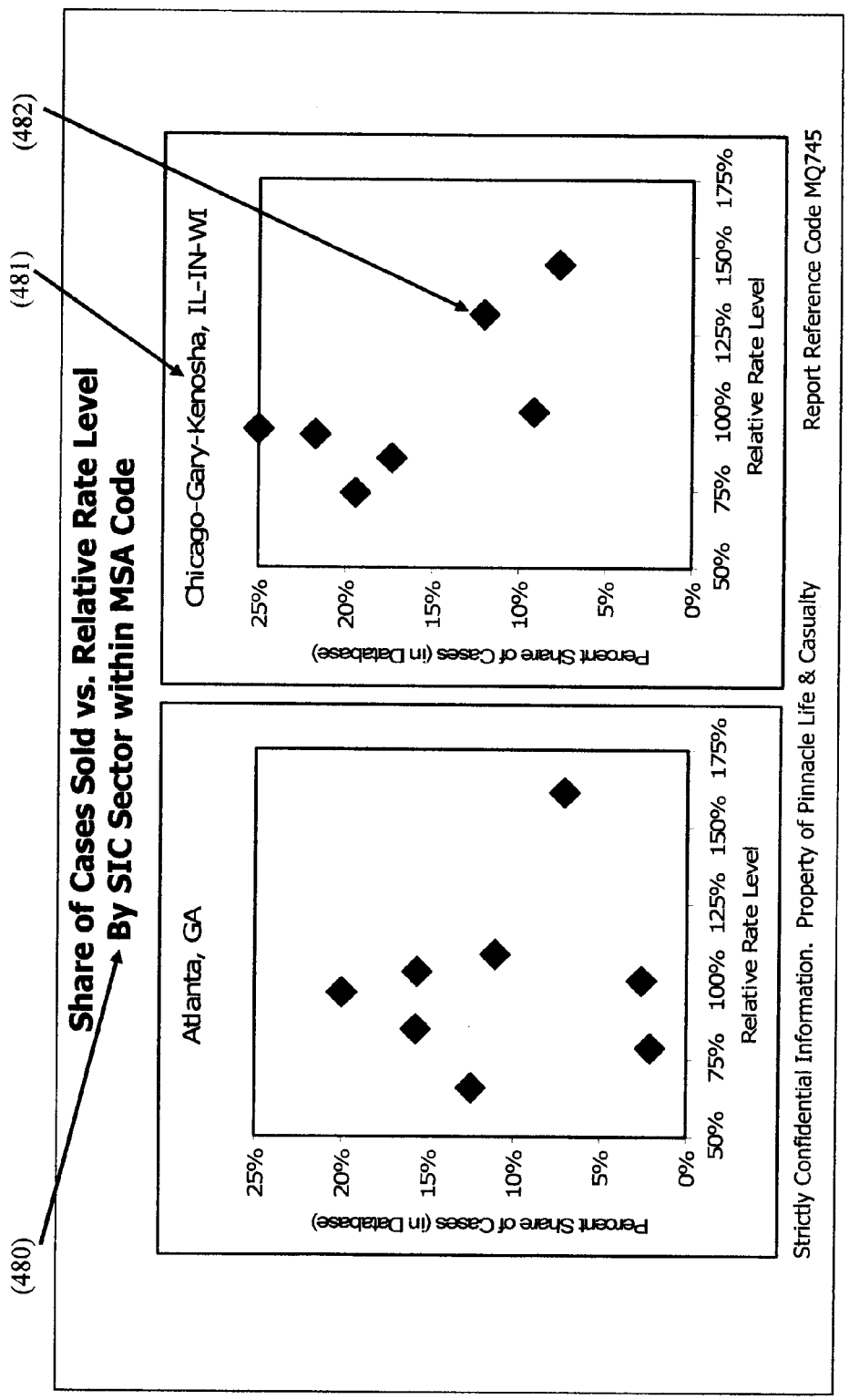
FIG. 36 is an example of a chart format displayed in response to the user initiating the option, from the screen of FIG. 20, to display a scatter chart regarding the relationship between rate level and market share.

When the user selects the option (192 in FIG. 6) to view and/or print a "Scatter Chart" chart by clicking the appropriate button (373 in FIG. 20), a chart similar to FIG. 36 is displayed on the computer screen and can be printed. Referring to FIG. 36, this chart format includes a description of the query design (480). The chart displays a graph for each group-level value (481). The vertical scale and horizontal scale is the same for each graph. Each data-point (482) represents a cell defined by the group-level value at the top of the graph and a unique detail-level value, not labeled. The location of the data-point on the graph is determined by the cell's statistics regarding: (a) the ratio of the company's average sold rate to the market-comparable average sold rate for that cell; and (b) the company's percentage share of total cases in that cell. If rules suppress display of market-comparable statistics for a cell, then the corresponding data-point is not graphed. This chart enables the user to determine the nature of correlation that exists between rate level and market share for each group-level value.

Figure 37:
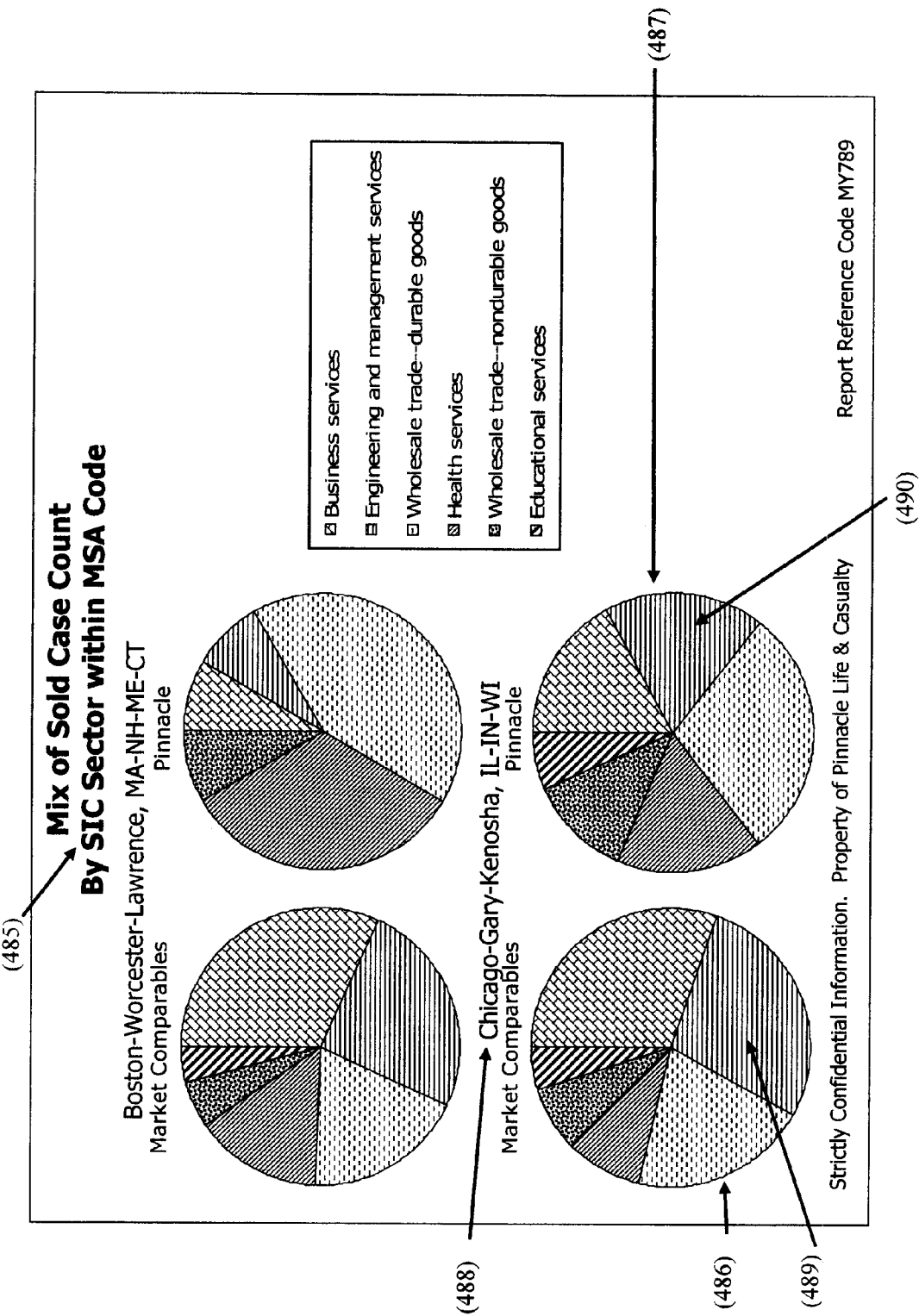
FIG. 37 is an example of a chart format displayed in response to the user initiating the option, from the screen of FIG. 20, to display business mix comparing the participating company with database statistics regarding the aggregate of all other participants.

When the user selects the option (192 in FIG. 6) to view and/or print a "Business Mix" chart by clicking the appropriate button (371 in FIG. 20), a chart similar to FIG. 37 is displayed on the computer screen and can be printed. Referring to FIG. 37, this chart format includes a description of the query design (485). The chart displays two pie graphs for each group-level value (488). One pie graph (486) shows the percentage of all market-comparable records with the same group-level value, grouped by detail-level value (489). The other pie graph (487) shows the percentage of all of the company's records with the same group-level value, grouped by detail-level value (490). This chart compares the mix of the company's business with market-comparable norms.

Figure 38:
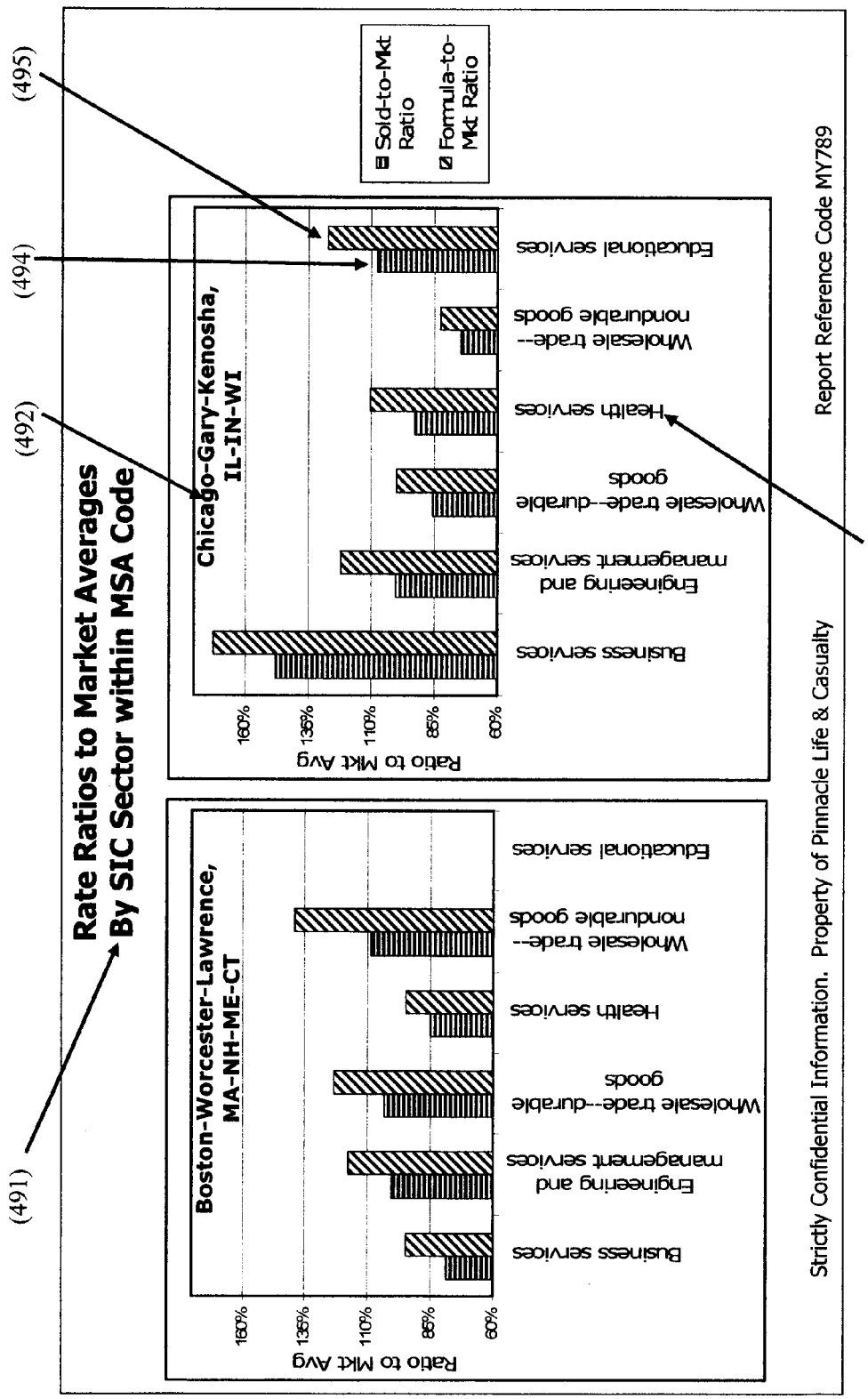
FIG. 38 is an example of a chart format displayed in response to the user initiating the option, from the screen of FIG. 20, to display the ratio of the company's rate levels to market-comparable rate levels.

When the user selects the option (192 in FIG. 6) to view and/or print a "Rate Ratios" chart by clicking the appropriate button (374 in FIG. 20), a chart similar to FIG. 38 is displayed on the computer screen and can be printed. Referring to FIG. 38, this chart format includes a description of the query design (491). The chart displays a graph for each group-level value (492). The horizontal axis displays each detail-level value (493). The vertical scale is the same for each graph. The chart displays: (a) the ratio (494) of the company's average sold rate to the market-comparable average sold rate; and (b) the ratio (495) of the company's average formula rate to the market-comparable average sold rate for each combination of group-level and detail-level value (e.g., cell). If rules suppress display of market-comparable statistics for a cell, then the market-comparable average rate is not graphed for that cell. This chart displays company rate levels relative to market-comparable rate levels cell-by-cell.

Figure 39:
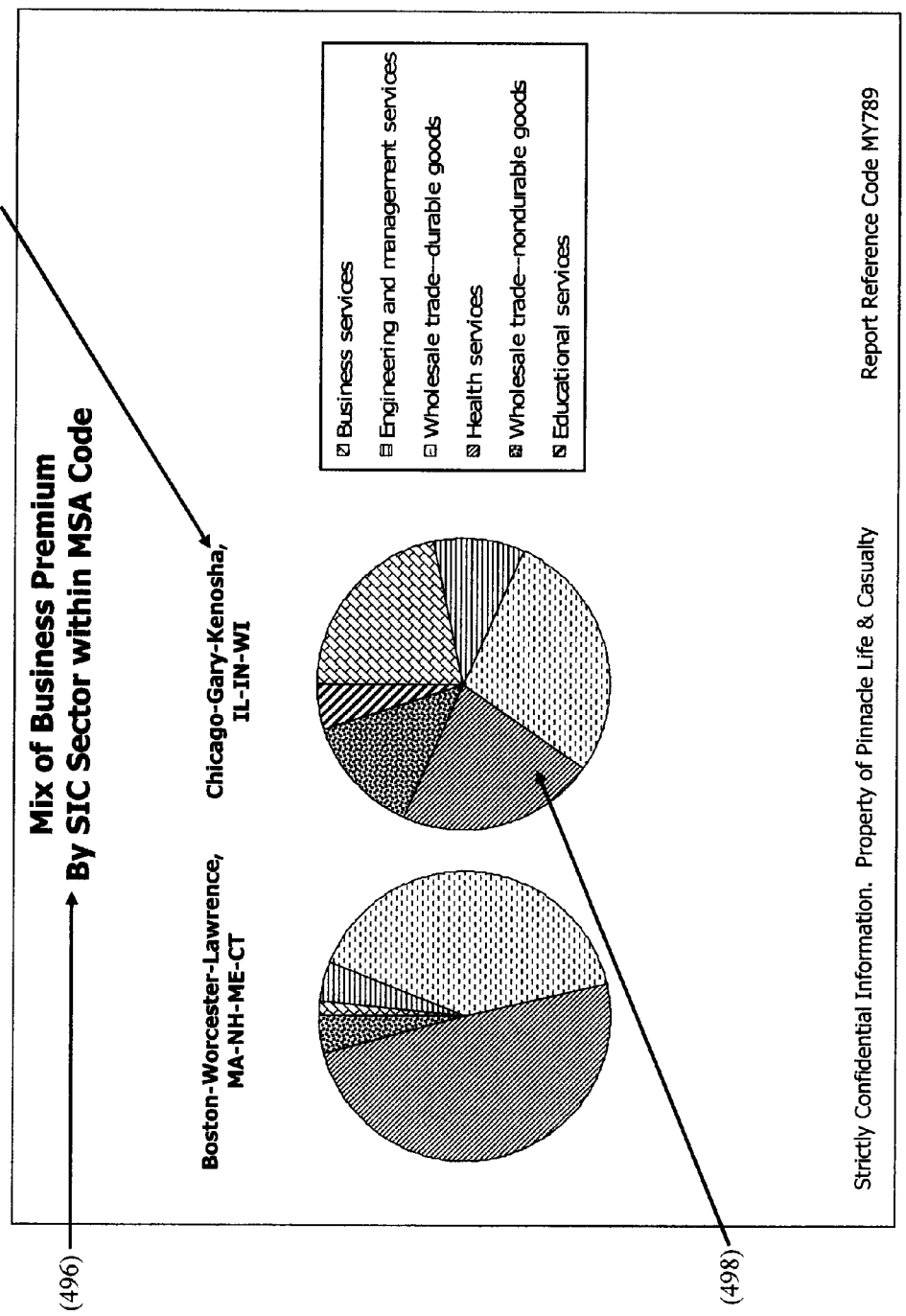
FIG. 39 is an example of a chart format displayed in response to the user initiating the option, from the screen of FIG. 20, to display business mix comparing subsets of the participating company's data with each other.

When the user selects the option (192 in FIG. 6) to view and/or print a "Business Mix" chart by clicking the appropriate button (376 in FIG. 20), a chart similar to FIG. 39 is displayed on the computer screen and can be printed. Referring to FIG. 39, this chart format includes a description of the query design (496). The chart displays one pie graph for each group-level value (497). A pie graph shows the distribution, by detail-level value (498), of the company's premium within a group-level value. This chart compares the premium mix of one subset of the company's data with the premium mix of another subset of the company's data.

Figure 40:
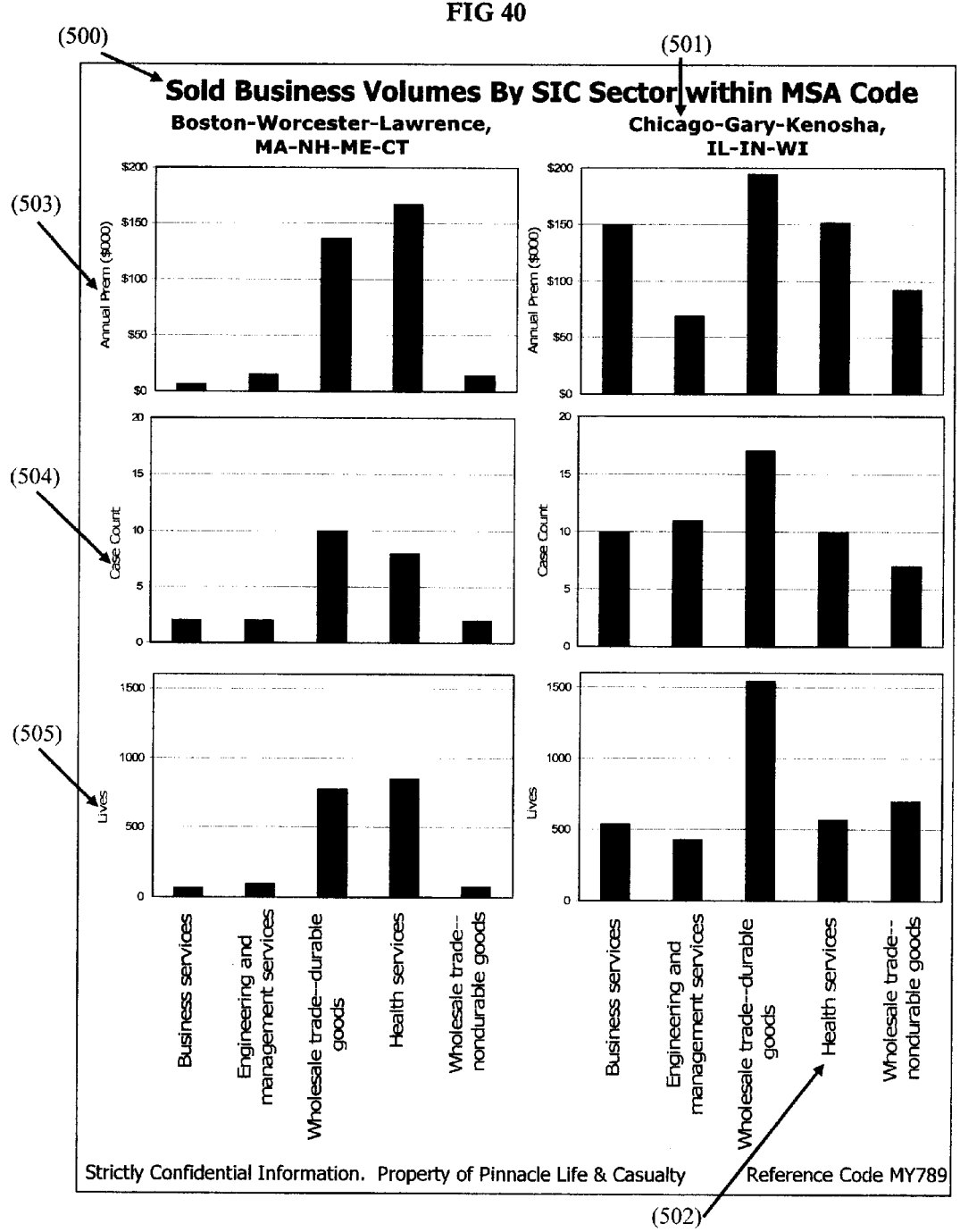
FIG. 40 is an example of a chart format displayed in response to the user initiating the option, from the screen of FIG. 20, to display business volumes relating to selected subsets of the participating company's data.

When the user selects the option (192 in FIG. 6) to view and/or print a "Business Volumes" chart by clicking the appropriate button (375 in FIG. 20), a chart similar to FIG. 40 is displayed on the computer screen and can be printed. Referring to FIG. 40, this chart format includes a description of the query design (500). There are three types of business volumes displayed: Annual Premium (503); Case Count (504); and Lives (505). Within each business volume type, there is one graph for each group-level value (501). The horizontal axis displays each detail-level value (502). The vertical scale is the same for each graph. This chart compares business volumes for one subset of the company's data with business volumes for another subset of the company's data.

Figure 41:
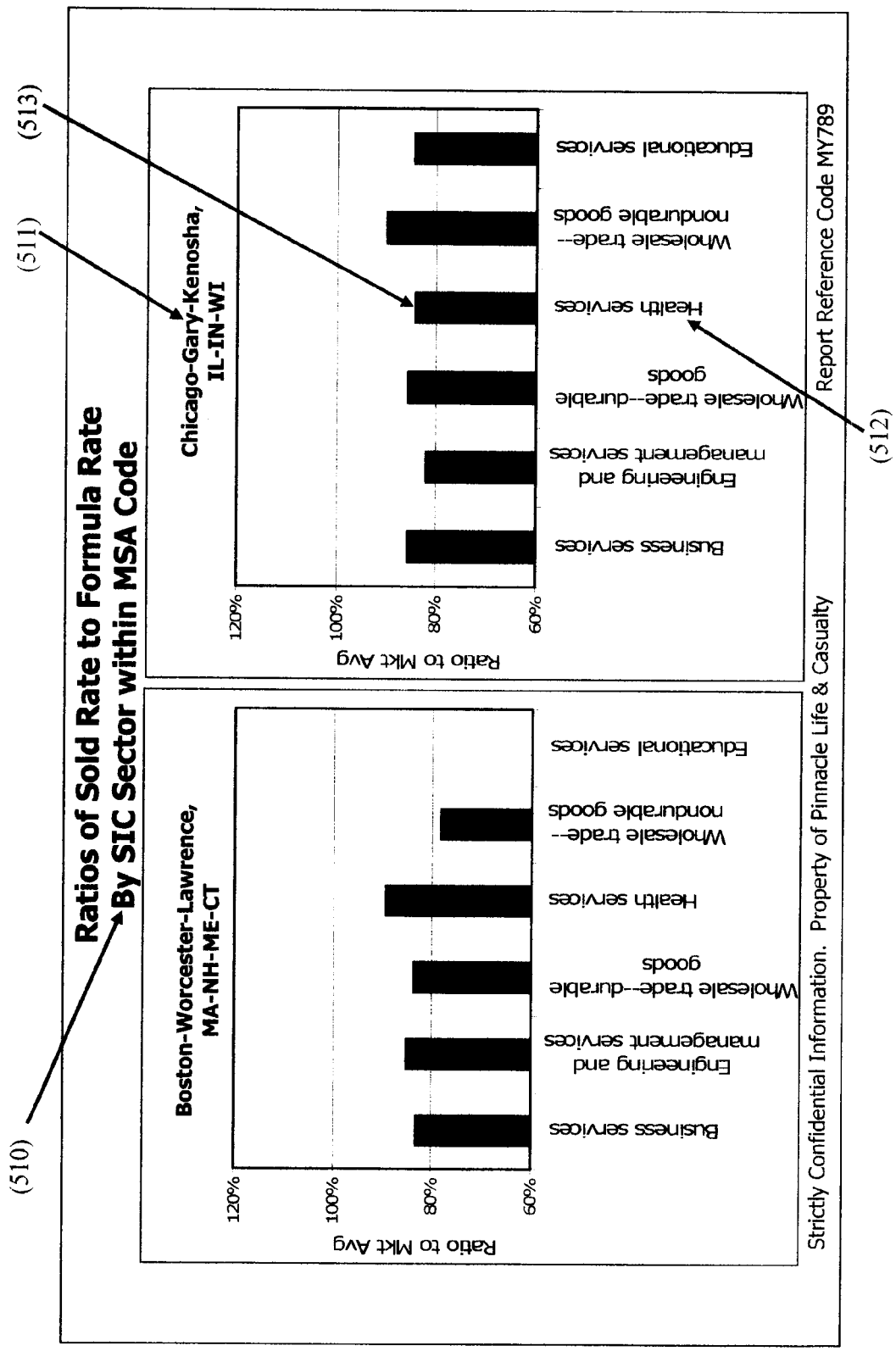
FIG. 41 is an example of a chart format displayed in response to the user initiating the option, from the screen of FIG. 20, to display the ratio of the company's average sold rate levels to the company's formula rate levels.

When the user selects the option (192 in FIG. 6) to view and/or print a "Sold-to-Formula Rate Ratios" chart by clicking on the appropriate button (377 in FIG. 20), a chart similar to FIG. 41 is displayed on the computer screen and can be printed. Referring to FIG. 41, this chart format includes a description of the query design (510). The chart displays a graph for each group-level value (511). The horizontal axis displays each detail-level value (512). The vertical scale is the same for each graph. The chart displays the ratio (513) of the company's average sold rate to the company's average formula rate for each combination of group-level and detail-level value (e.g., cell). This chart compares the company's average sold-rate levels with the company's average formula-rate levels cell-by-cell.

In the original configuration of the system and related process of the present invention, the information database, the formatted query storage program, and the database evaluation and reporting program are all provided to relevant users on a software storage medium, such as a Compact Disk (CD). Further, the operating programs required to initially install and subsequently run the evaluation and reporting program are also preferably provided on the same CD. However, any one or any combination of, the information database, the query storage program, and the evaluation and reporting program may be stored on a CD, stored on a centralized computing device, such as the third-party administrator's central computer or the user's centralized application or database server, or in a distributed manner. For example, a user of the present invention may be provided with a CD or other transportable storage medium that only includes the evaluation and reporting program and the query storage program, while the information database may be stored on the third-party administrator's central computer and made accessible by the user via a secure internet connection. Alternatively, the query storage program alone may be deployed on one or more computing devices of the user and the evaluation and reporting program and the information database may be controlled by the third-party administrator and made accessible to authorized users. That access may be made as an attachment to an electronic mail communication, as stored on a storage medium, or by internet access using a browser-supported website.

The processes, steps thereof and various examples and variations of these processes and steps as described herein, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components described above and may be distributed across one or more such components.

In the original configuration of the system and related process of the present invention, the information database, the formatted query storage program, and the database evaluation and reporting program are all provided to relevant users on a software storage medium, such as a Compact Disk (CD). Further, the operating programs required to initially install and subsequently run the evaluation and reporting program are also preferably provided on the same CD. However, any one or any combination of, the information database, the query storage program, and the evaluation and reporting program may be stored on a CD, stored on a centralized computing device, such as the third-party administrator's central computer or the user's centralized application or database server, or in a distributed manner. For example, a user of the present invention may be provided with a CD or other transportable storage medium that only includes the evaluation and reporting program and the query storage program, while the information database may be stored on the third-party administrator's central computer and made accessible by the user via a secure internet connection. Alternatively, the query storage program alone may be deployed on one or more computing devices of the user and the evaluation and reporting program and the information database may be controlled by the third-party administrator and made accessible to authorized users. That access may be made as an attachment to an electronic mail communication, as stored on a storage medium, or by internet access using a browser-supported website.

The processes, steps thereof and various examples and variations of these processes and steps as described herein, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components described above and may be distributed across one or more such components.

A number of examples to help illustrate the invention have been described. Nevertheless, it will be understood that various modifications may be made without departing from the spirit and scope of the invention. Accordingly, other embodiments are within the scope of the claims appended hereto.

What is claimed is:

1. A method for providing to a contributor information related to goods or services offered by the contributor and one or more other contributors, the method comprising the steps of:
   a. compiling information related to the goods or services offered by the contributor and the one or more other contributors;
   b. creating an information database of the compiled information, wherein the information database is segregated into a first information group of the information related only to the contributor and a second information group of the information related to the one or more other contributors; and
   c. enabling the contributors to access the contributor's own first information group, and to access information of the second information group without permitting the contributor to determine specific information provided by the one or more other contributors of the second information group, provided the information accessed from the second information group includes a defined minimum amount from the one or more other contributors.

2. The method as claimed in claim 1 wherein the information includes goods or service features, sales information, pricing information, demographic information, and time period information obtained from the one or more contributors, other non-contributor parties, or a combination of both.

3. The method as claimed in claim 1 further comprising the step of denying to the contributor access to selected information from the second information group if the contributor does not provide to the information database the same type of selected information of the contributor's own.

4. The method as claimed in claim 1 further comprising the step of enabling the contributor to access and query the database directly for specific market information of interest.

5. The method as claimed in claim 1 further comprising the steps of:
   a. enabling the contributor to define a query of the compiled information based on individual portions of the information or selectable combinations of individual portions of the information to create unique outcomes; and
   b. generating statistics based upon the outcomes obtained based upon the query.

6. The method as claimed in claim 5 wherein the step of generating statistics includes the steps of:
   a. calculating statistics related only to the first information group;
   $b_1$ defining minimum amount of the information related to the particular query made by the querying contributor exists; $b_2$ determining with respect to the second information group whether the defined amount information exists and
   c. presenting to the querying contributor information only for defined information of the first information group and of the second information group meeting the restriction of step $b_2$.

7. The method as claimed in claim 1 further comprising the step of storing a portion or all of the output of any query of the database.

8. The method as claimed in claim 1 further comprising the step of transferring a portion or all of the output of any query of the database to an electronic spreadsheet.

9. The method as claimed in claim 1 further comprising the step of enabling the contributor to supplement information of the first information group with the contributor's selectable information such that the selectable information is accessible only by the contributor.

10. The method as claimed in claim 1 further comprising the step of enabling the storage of attributes of a query for subsequent retrieval.

11. The method as claimed in claim 10 further comprising the step of enabling the retrieval of a stored query and re-use or modify the stored query to create a new query.

12. The method as claimed in claim 1 wherein the step of enabling the contributor to access the contributor's own first information group and to access information of the second information group without permitting the contributor to determine specific information provided by the one or more other contributors of the second information group includes the steps of:
   c1. in response to a query from the contributor, $c'_1$ defining minimum amount of the information related to the particular query made by the querying contributor minimum amount of the defined information related to the particular query exists; $c''_1$ determining with respect to the second information group whether the defined amount information exists and
   c2. presenting to the contributor the requested information only for defined information of the second information group meeting the restriction of step $c''_1$.

13. The method as claimed in claim 1 wherein the step of enabling the contributor to access the contributor's own first information group and to access information of the second information group without permitting the contributor to determine specific information provided by the one or more other contributors of the second information group includes the step of establishing rules of access to information of the second information group.

14. The method as claimed in claim 1 wherein the contributor seeking access to the information database does so through a graphical user interface represented on a display of a computing device through which the contributor accesses the information database, the method further comprising the step of configuring one or more outputs of the information accessed into summary representations.

15. The method as claimed in claim 1 further comprising the step of configuring the graphical user interface to present a summary depiction of database query options and queries made.

16. The method as claimed in claim 1 wherein the information database includes a plurality of cells of information organized based on values, the method further comprising the step of configuring one or more outputs of the information accessed into summary representations organized by parameter.

17. The method as claimed in claim 16 further comprising the step of establishing rules for suppressing certain ones of the plurality of cells for summary representation.

18. The method as claimed in claim 1 further comprising the step of configuring one or more query options for the contributor to query the information database for display on a computer display in a format that eliminates from display a query option not applicable to the defined portion of information to be queried.

19. The method as claimed in claim 1 further comprising the step of configuring a computer program to enable querying of the information database by the contributor, analysis of the information acquired in a query, and reporting of the information, wherein the program may operate on a computing system of the contributor independent of any other programs running on the same computing system.

20. The method as claimed in claim 1 further comprising the step of establishing standardized query formats and output formats selectable by the contributor.

21. The method as claimed in claim 1 further comprising the step of presenting database information obtained from a query into a format relating the contributor's corresponding information from the first information group to corresponding information of the second information group.

22. The method as claimed in claim 1 further comprising the steps of enabling the contributor to query the information database for information of interest and limiting query options to be consistent with values of the information database.

23. A method for providing to contributors in one or more industries market information related to the offerings made by the contributors, such market information including market information of contributors and non-contributors, the method comprising the steps of:
   a. surveying each contributor for defined public and private product or services information;
   b. compiling the defined public and private product or services information obtained from all surveyed contributors and market information from non-contributors;
   c. creating for each contributor an information database of the defined public and private product or services information obtained from all contributors and the market information of the non-contributors, wherein each contributor's information database is segregated into a first information group of an individual contributor's particular defined public and private product or services information and a second information group of the compiled defined public and private product or services information of all other contributors and of the market information of the non-contributors; and
   d. enabling each contributor to access the contributor's own first information group and to access information of the second information group without permitting the contributor to determine specific information provided by the one or more other contributors of the second information group, provided the information accessed from the second information group includes a defined minimum amount from the other contributors.

24. The method as claimed in claim 23 further comprising the step of configuring an output according to one or more parameters unique to a particular querying contributor as defined by that querying contributor.

25. The method as claimed in claim 23 further comprising the step of enabling the contributors to access and query the database directly for specific market information of interest.

26. The method as claimed in claim 25 further comprising the step of denying to a querying contributor access to selected information from the second information group if the querying contributor does not provide to the information database the same type of information of the contributor's own subject of the query.

27. The method as claimed in claim 1 wherein the contributor is enabled to access either or both of the contributor's own first information group and the second information group through an authorized user.

28. The method as claimed in claim 23 wherein each contributor is enabled to access either or both of the contributor's own first information group and the second information group through an authorized user.

29. A method for providing to a contributor information related to the goods or services offered by the contributor and one or more other contributors, the method comprising the steps of:
  a. compiling the information related to the goods or services offered by the contributor and the one or more other contributors;
  b. creating an information database of the compiled information, wherein the information database is segregated into a first information group of the information related only to the contributor and a second information group of the information related to the one or more other contributors; and
  c. enabling the contributor to access the contributor's own first information group, and to access information of the second information group without permitting the contributor to determine specific information provided by the one or more other contributors of the second information group, and provided the contributor has provided to the information database information of the same type sought from the second information group.

30. The method as claimed in claim 29 wherein the contributor is enabled to access either or both of the contributor's own first information group and the second information group through an authorized user.

* * * * *

UNITED STATES PATENT AND TRADEMARK OFFICE
CERTIFICATE OF CORRECTION

PATENT NO. : 7,197,508 B1
APPLICATION NO. : 10/626959
DATED : March 27, 2007
INVENTOR(S) : Frederick R. Brown, III It is certified that error appears in the above-identified patent and that said Letters Patent is hereby corrected as shown below:

Column 21: Delete lines 42-67

Column 22: Delete lines 1-24
Line 46, replace "contributors" with --contributor--
Line 49, insert --what-- after "determine" and insert --was-- after "information"
Line 50, insert --which of the-- after "by"

Column 23: Line 14, insert --a-- after "defining"
Lines 14-16, replace "related to the particular query made by the querying contributor exists" with --required from the second information group in order to present information of the second information group in response to any particular query--
Line 16, insert a paragraph return after "particular query;"
Line 17, insert --minimum-- after "defined" and insert --of-- after "amount"
Line 18, insert semicolon after "exists"
Line 22, replace "b2" with --b1--
Line 39, replace "modify" with --modification of--
Line 44, replace "specific information provided by" with --what specific information was provided by which of--
Line 47, delete "in response to a query from the contributor , c'1"
Line 48, insert --a-- after "defining" and replace "related to" with --required from--
Lines 49-53, replace "in response to a query from the contributor, c'1 defining minimum amount of the information related to the particular query made by the querying contributor minimum amount of the defined information related to the particular query exists; c'1 determining with respect to the second information group whether the defined amount information exists and" with --the second information group in order to present information of the second information group in response to any particular query;
c2. determining with respect to the second information group whether the defined minimum amount of information exists; and--
Line 54, replace "c2." with --c3.   in response to a query from the contributor,--
Line 56, replace "c"1" with --c1--
Line 61, insert --what-- after "determine" and insert --was-- after "information" and insert --which-- after "by"

UNITED STATES PATENT AND TRADEMARK OFFICE
CERTIFICATE OF CORRECTION

PATENT NO. : 7,197,508 B1
APPLICATION NO. : 10/626959
DATED : March 27, 2007
INVENTOR(S) : Frederick R. Brown, III It is certified that error appears in the above-identified patent and that said Letters Patent is hereby corrected as shown below:

Column 25: Line 2, insert --what-- after "determine" and insert --was-- after "information"
Line 3, insert --which of-- after "by"

Column 26: Line 17, insert --what-- after "determine" and insert --was-- after "information"
Line 18, insert --which of-- after "by"

Signed and Sealed this

Twelfth Day of June, 2007

JON W. DUDAS
*Director of the United States Patent and Trademark Office*